United States Patent
Ikemoto et al.

(10) Patent No.: US 8,825,322 B1
(45) Date of Patent: Sep. 2, 2014

(54) BICYCLE COMPONENT CONTROLLING APPARATUS

(71) Applicant: Shimano Inc., Osaka (JP)

(72) Inventors: Hideki Ikemoto, Osaka (JP); Tadashi Ichida, Osaka (JP); Nobukatsu Hara, Osaka (JP); Toyoto Shirai, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/862,889

(22) Filed: Apr. 15, 2013

(51) Int. Cl.
| | |
|---|---|
| G06F 19/00 | (2011.01) |
| B62K 23/02 | (2006.01) |
| B62K 23/06 | (2006.01) |
| B62K 23/08 | (2006.01) |
| B62D 17/00 | (2006.01) |
| B60K 26/02 | (2006.01) |

(52) U.S. Cl.
CPC ............... B62K 23/02 (2013.01); B62K 23/06 (2013.01); B62K 23/08 (2013.01); B62K 2207/00 (2013.01); B62D 17/00 (2013.01); B60K 26/02 (2013.01)
USPC ............ 701/60; 280/277; 280/279; 280/282; 280/288.4; 74/502.4; 74/502.6; 74/551.1; 74/551.3; 74/502.5; 340/427

(58) Field of Classification Search
CPC ........ B62K 23/02; B62K 23/06; B62K 23/08; B62K 2207/00; B62K 17/00; B60K 26/02
USPC ................. 701/60; 280/277, 279, 282, 288.4; 74/502.4, 502.6, 551.1, 551.3, 502.5; 180/24.19, 24.21; 340/427
See application file for complete search history.

(56) References Cited

U.S. PATENT DOCUMENTS

| | | | | |
|---|---|---|---|---|
| 6,004,243 | A * | 12/1999 | Ewert | 482/8 |
| 6,450,922 | B1 * | 9/2002 | Henderson et al. | 482/8 |
| 6,558,180 | B2 * | 5/2003 | Nishimoto | 439/282 |
| 6,600,411 | B2 * | 7/2003 | Nishimoto | 340/432 |
| 6,848,930 | B2 * | 2/2005 | Fukuda | 439/349 |
| 7,902,967 | B2 * | 3/2011 | Takebayashi | 340/432 |
| 8,091,910 | B2 | 1/2012 | Hara et al. | |
| 2002/0127907 | A1 * | 9/2002 | Nishimoto | 439/502 |
| 2002/0173193 | A1 * | 11/2002 | Nishimoto | 439/349 |
| 2004/0137777 | A1 * | 7/2004 | Fukuda | 439/349 |
| 2006/0047372 | A1 * | 3/2006 | Uno | 701/1 |
| 2013/0090195 | A1 | 4/2013 | Yamaguchi et al. | |
| 2013/0090196 | A1 | 4/2013 | Yamaguchi et al. | |
| 2013/0151073 | A1 * | 6/2013 | Tetsuka | 701/37 |

FOREIGN PATENT DOCUMENTS

DE          102 42 447 A1     3/2004

* cited by examiner

*Primary Examiner* — McDieunel Marc
(74) *Attorney, Agent, or Firm* — Global IP Counselors

(57) ABSTRACT

A bicycle component controlling includes at least a first sensor and a controller. The first sensor detects a first operating condition, whether a rider is sitting on a bicycle seat. A second sensor is provided that detects a second operating condition. The sensors output signals indicative of the respective operating conditions. The controller is operatively connected to at least the first sensor and possibly the second sensor. The controller is configured to generate a component control command to control a bicycle component based on at least the first signal and the possibly the second signal. The bicycle component is a component other than an automatic transmission and a suspension when the second sensor is not provided. If the second sensor is provided, a suspension and automatic transmission is controlled, or components other than an automatic transmission and a suspension is controlled.

20 Claims, 13 Drawing Sheets

BICYCLE COMPONENT CONTROLLING APPARATUS

BACKGROUND

1. Field of the Invention

This invention generally relates to a bicycle component controlling apparatus. More specifically, the present invention relates to a bicycle component controlling apparatus.

2. Background Information

In the past, a force sensor has been arranged on a saddle bracket. An evaluation unit controls a bicycle suspension or automatic transmission based on the output of the sensor. An example of such an apparatus is disclosed in German Patent Publication DE 102 42 447 A1.

SUMMARY

It has been discovered that it is difficult to set certain electrical bicycle components of the bicycle to a suitable setting only using the force sensor on the saddle bracket. In particular, it can be difficult to set an electrically controlled bicycle automatic transmission (automatic shifting mode) and an electrically controlled bicycle suspension (front suspension travel, front suspension lockout and/or rear suspension pedaling damping) to suitable settings only using the force sensor on the saddle bracket.

Therefore, the present disclosure is directed to a bicycle component controlling apparatus, which controls an electrically controlled bicycle automatic transmission (automatic shifting mode) and an electrically controlled bicycle suspension (front suspension travel, front suspension lockout and/or rear suspension pedaling damping) based on more than only a saddle force sensor. In addition, the present disclosure is directed to a bicycle component controlling apparatus, which controls other electrically controlled bicycle components (e.g., rear derailleur chain plate rotational resistance control, front and rear shifting synchronization control and cycle computer angle control) based on a force sensor and an additional sensor. While it has been discovered that control of these features of a bicycle can be improved when based on information from an additional sensor in addition to a saddle force sensor, in some situations it may be possible to adequately control other electrically controlled bicycle components (e.g., rear derailleur chain plate rotational resistance control, front and rear shifting synchronization control and cycle computer angle control) other than a bicycle automatic transmission and a bicycle suspension based only on information from a saddle force sensor.

In accordance with a first aspect of the present invention, a bicycle component controlling apparatus is proposed that basically comprises a first sensor configured to detect a first operating condition and to output a first signal indicative of the first operating condition, the first operating condition being whether a rider is sitting on a bicycle seat of a bicycle; and a second sensor configured to detect a second operating condition and to output a second signal indicative of the second operating condition, the second operating condition being different from the first operating condition; and a controller operatively connected to the first sensor and the second sensor, the controller being configured to generate a component control command to control a bicycle component based on at least the first signal and the second signal.

In accordance with a second aspect of the present invention, the bicycle component controlling apparatus of the first aspect is configured so that the second operating condition is a height of the bicycle seat.

In accordance with a third aspect of the present invention, the bicycle component controlling apparatus of the first aspect is configured so that the second operating condition is rotation of a bicycle crank.

In accordance with a fourth aspect of the present invention, the bicycle component controlling apparatus of the first aspect further comprises a third sensor configured to detect a third operating condition and to output a third signal indicative of the third operating condition, the third operating condition being different from the first and second operating conditions, the controller being operatively connected to the third sensor, the controller being further configured to generate the component control command based on the first, second and third signals.

In accordance with a fifth aspect of the present invention, the bicycle component controlling apparatus of the fourth aspect is configured so that the second operating condition is a height of the bicycle seat.

In accordance with a sixth aspect of the present invention, the bicycle component controlling apparatus of the fifth aspect is configured so that the third operating condition is rotation of a bicycle crank.

In accordance with a seventh aspect of the present invention, the bicycle component controlling apparatus of the fourth aspect is configured so that the second operating condition is rotation of a bicycle crank.

In accordance with an eighth aspect of the present invention, the bicycle component controlling apparatus of the first aspect is configured so that the component control command is a front suspension control command.

In accordance with a ninth aspect of the present invention, the bicycle component controlling apparatus of the eighth aspect is configured so that the front suspension control command is an amount of travel control command.

In accordance with a tenth aspect of the present invention, the bicycle component controlling apparatus of the eighth aspect is configured so that the front suspension control command is a lockout control command.

In accordance with an eleventh aspect of the present invention, the bicycle component controlling apparatus of the first aspect is configured so that the component control command is a rear suspension control command.

In accordance with a twelfth aspect of the present invention, the bicycle component controlling apparatus of the eleventh aspect is configured so that the rear suspension control command is a pedaling damping control command.

In accordance with a thirteenth aspect of the present invention, the bicycle component controlling apparatus of the first aspect is configured so that the component control command is a rear derailleur chain plate rotational resistance control command.

In accordance with a fourteenth aspect of the present invention, the bicycle component controlling apparatus of the first aspect is configured so that the component control command is a front and rear shifting synchronization control command.

In accordance with a fifteenth aspect of the present invention, the bicycle component controlling apparatus of the first aspect is configured so that the component control command is an automatic shifting mode control command.

In accordance with a sixteenth aspect of the present invention, the bicycle component controlling apparatus of the first aspect is configured so that the component control command is a cycle computer angle control command.

In accordance with a seventeenth aspect of the present invention, a bicycle component controlling apparatus is proposed that basically comprises a first sensor configured to detect a first operating condition and to output a first signal indicative of the first operating condition, the first operating condition being whether a rider is sitting on a bicycle seat of a bicycle; and a controller operatively connected to the first sensor, the controller being configured to generate a component control command to control a bicycle component other than an automatic transmission and a suspension based on at least the first signal.

In accordance with an eighteenth aspect of the present invention, the bicycle component controlling apparatus of the seventeenth aspect is configured so that the component control command is a rear derailleur chain plate rotational resistance control command.

In accordance with a nineteenth aspect of the present invention, the bicycle component controlling apparatus of the seventeenth aspect is configured so that the component control command is a front and rear shifting synchronization control command.

In accordance with a twentieth aspect of the present invention, the bicycle component controlling apparatus of the seventeenth aspect is configured on that the component control command is a cycle computer angle control command.

Other objects, features, aspects and advantages of the disclosed bicycle component controlling apparatus will become apparent to those skilled in the art from the following detailed description, which, taken in conjunction with the annexed drawings, discloses preferred embodiments of the bicycle component controlling apparatus.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
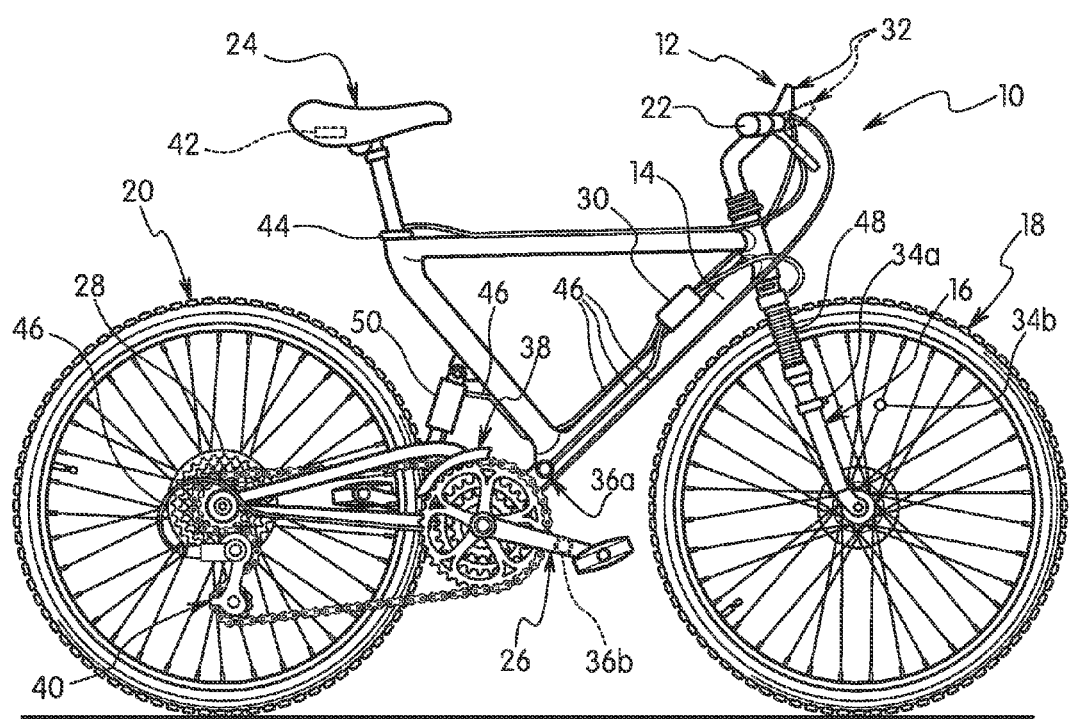
FIG. 1 is a side elevational view of a bicycle that is equipped with a bicycle component controlling apparatus in accordance with a first embodiment.
Figure 2:
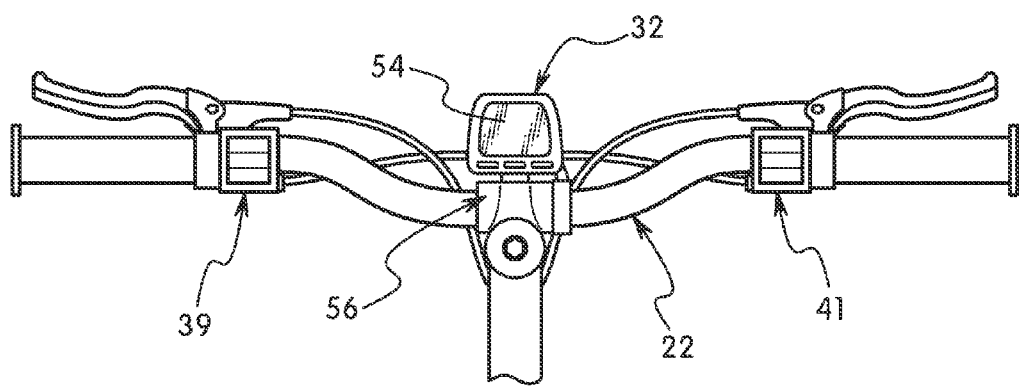
FIG. 2 is a top plan view of the handlebars of the bicycle illustrated in FIG. 1, with a cycle computer, electrical shifters and traditional brake levers mounted thereto.
Figure 3:
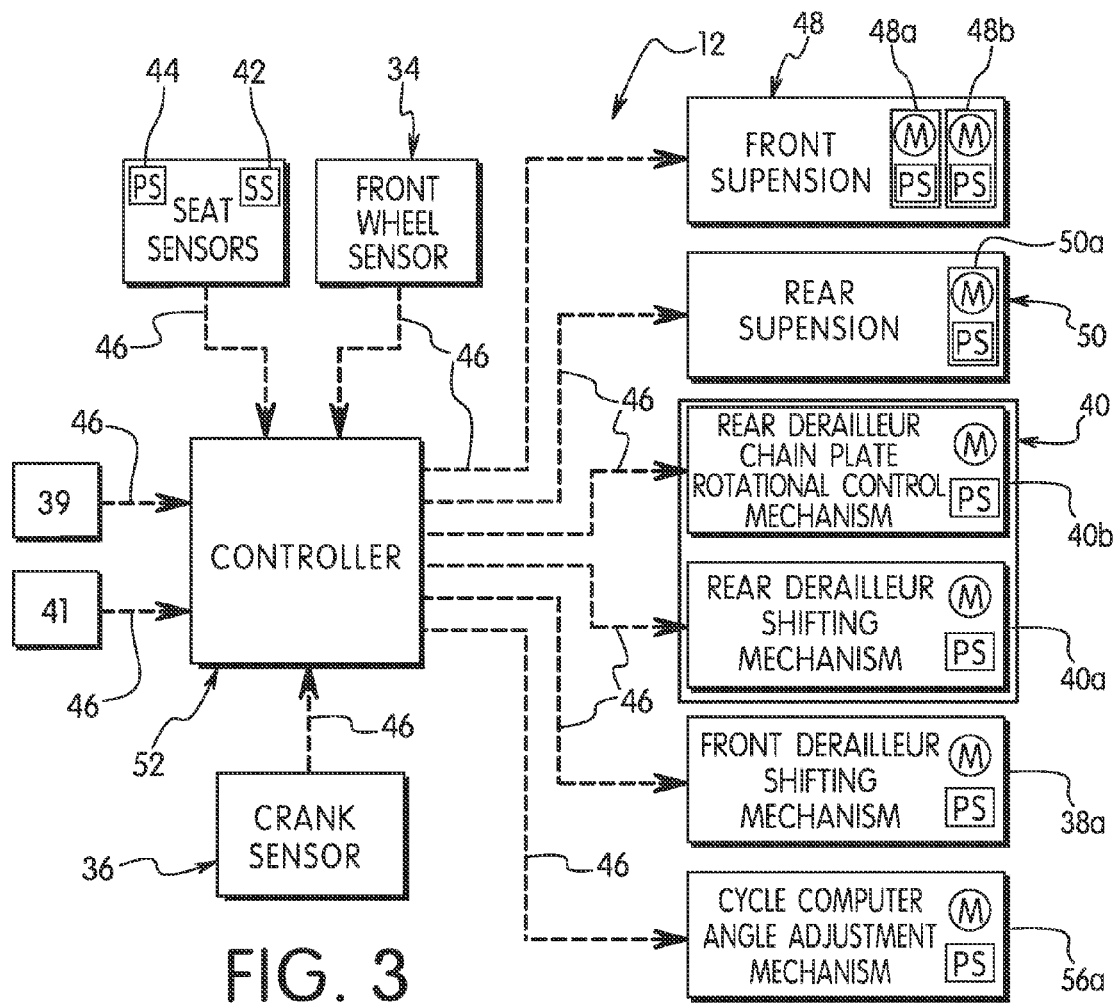
FIG. 3 is a block diagram of the parts of the bicycle component controlling apparatus illustrated in FIG. 1.
Figure 4:
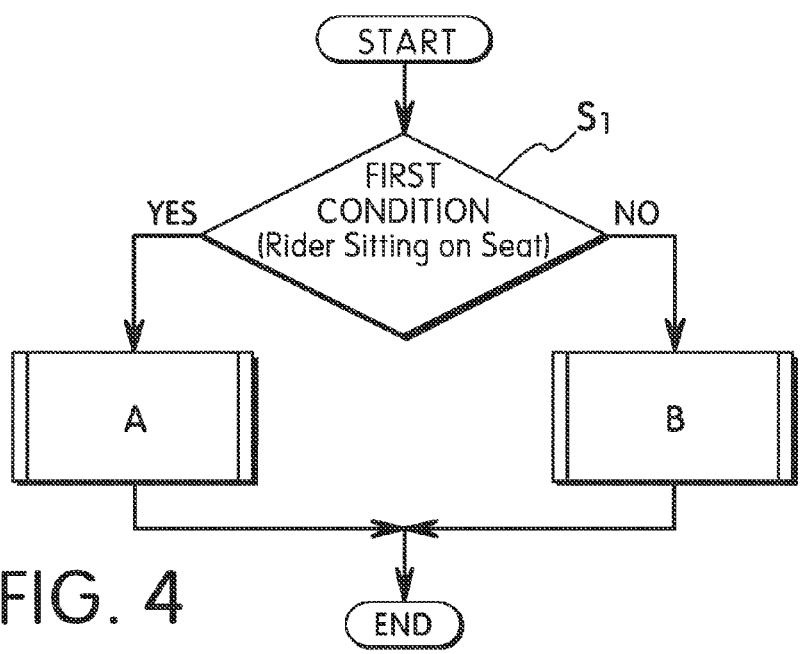
FIG. 4 is a flowchart illustrating a main control process of the bicycle component controlling apparatus.

Referring initially to FIGS. 1-3, a bicycle 10 is illustrated with a bicycle component controlling apparatus 12 in accordance with a first embodiment. The bicycle component controlling apparatus 12 is configured and arranged to control various electrically controlled components as explained below.

The bicycle 10 in FIG. 1 is a dual suspension (off road) bicycle that includes a main frame 14 with a rear suspension portion, a front suspension fork 16 pivotally coupled to the main frame 14. Front and rear wheels 18 and 20 are rotatably mounted to the from suspension fork 16 and the rear suspension portion of the main frame 14, respectively. A handlebar 22 is fixed to the top of the front suspension fork 16 in order to steer the bicycle 10. A bicycle seat or saddle 24 is adjustably mounted at the top/rear of the main frame 14. A front pedal crank set 26 with a plurality of front chain rings is pivotally mounted to the main frame 14 to drive a chain. Pedaling force from the front pedal crank set 26 is transferred to the chain, which in turn transfers the pedaling force to the rear wheel 20 via a set of rear sprockets 28 mounted to the rear wheel 20 via a freewheel mechanism. Conventional front and rear mechanical braking mechanisms are also provided.

Referring still to FIGS. 1-3, the bicycle 10 further includes numerous electrical components. In particular, the bicycle 10 preferably includes a power supply (i.e. battery) 30, a cycle computer 32, a front wheel sensor 34, a crank rotation sensor 36, an electrically operated front derailleur 38, an electrically operated rear derailleur 40, a rider sitting sensor 42, a seat height position sensor 44, a plurality of electrical wires 46, an electrically controlled front suspension 48, and an electrically controlled rear suspension 50. The power supply 30 preferably includes a conventional battery that can be rechargeable if desired. The rider sitting sensor 42 is a first sensor, the seat height position sensor 44 is a second or third sensor, and the crank rotation sensor 36 is a second or third sensor. The power supply 30 is preferably electrically coupled to the other electrical components to supply power thereto in a conventional manner. Likewise, the cycle computer 32 is electrically coupled to the other electrical components to send and receive electrical signals to and from the other electrical components.

Referring to FIGS. 1 and 3, the front wheel sensor 34 is preferably a conventional front wheel sensor, which includes a sensing part 34a mounted on the front fork 16 and a magnet 34b mounted on a spoke of the front wheel 18. The sensing part 34a sends a signal to the cycle computer 32 each time the magnet 34b passes by the sensing part 34a in a conventional manner. The cycle computer 32, from the signals received by the sensing part 34a, can determine if the front wheel 18 is rotating and at what speed (rotations per unit time). From this information, the cycle computer 32 can determine, speed, distance, average speed, maximum speed, riding time, etc. in a conventional manner.

Referring again to FIGS. 1 and 3, the crank rotation sensor 36 is preferably a conventional crank rotation sensor. Possible structures for the crank rotation sensor 36 include a torque sensor, a rotational sensor on a guide pulley of the rear derailleur, a cadence sensor, or a rotational sensor on free wheel. In the illustrated embodiment, the crank rotation sensor 36 is a cadence sensor, which includes a sensing part 36a mounted on the main frame 14 and a magnet 36b mounted on a crank arm of the pedal crank set 26. The sensing part 36a sends a signal to the cycle computer 32 each time the magnet 36b passes by the sensing part 36a in a conventional manner. The cycle computer 32, from the signals received by the sensing part can 36a, can determine if the pedal crank set 26 is rotating and at what speed (rotations per unit time) in a conventional manner.

Referring still to FIGS. 1 and 3, the electrically operated front derailleur 38 is preferably conventional, and thus, preferably includes a front derailleur shifting mechanism 38a. Similarly, the electrically operated rear derailleur 40 is preferably conventional, and thus, preferably includes a rear derailleur shifting mechanism 40a. The electrically operated rear derailleur 40 also preferably includes a rear derailleur chain plate rotational resistance control mechanism 40b. The front derailleur shifting mechanism 38a and the rear derailleur shifting mechanism 40a receive control signals from the cycle computer 32 to shift the front and rear derailleurs 38 and 40, respectively. The rear derailleur chain plate rotational resistance control mechanism 40b also receives control signals from the cycle computer 32 to turn ON/OFF the rear derailleur chain plate rotational resistance control mechanism 40b. The front derailleur shifting mechanism 38a, the rear derailleur shifting mechanism 40a and the rear derailleur chain plate rotational resistance control mechanism 40b are conventional components, each preferably including a printed circuit board PS to process control signals sent from the cycle computer 32 and a motor M to carry out the control thereof, as seen in FIG. 3. Since these components are conventional, these components will not be discussed and/or illustrated in further detail herein. Front and rear electrical shifters 39 and 41 are mounted on the handlebar 22 to perform manual electrical shifting if needed and/or desired, such as if/when the shifting mode is turned off. The front and rear electrical shifters 39 and 41 each include an up shift switch and a down shift switch.

Referring still to FIGS. 1 and 3, the rider sitting sensor 42 will now be explained in more detail. The rider sitting sensor 42 is preferably conventional. Possible structures for the rider sitting sensor 42 include a strain gage(s), semiconductor sensor(s) or pressure sensor(s), which may be disposed on the saddle 24 or the seat post supporting the saddle 24. In the illustrated embodiment, the rider sitting sensor 42 is preferably a force sensor arranged on a saddle bracket of the saddle 24 in accordance with DE 102 42 447 A1.

Referring still to FIGS. 1 and 3, the seat height position sensor 44 will now be explained in more detail. The seat height position sensor 44 is preferably conventional. Possible structures for seat height position sensor 44 include a potentiometer, or optical device or magnet sensor, which may be disposed within the seat post supporting the saddle 24 or externally of the seat post. In the illustrated embodiment, the seat height position sensor 44 is preferably constructed in accordance with U.S. Pat. No. 8,246,065.

Referring still to FIGS. 1 and 3, the electrically controlled front suspension 48 is preferably conventional, and thus, preferably includes a front suspension travel adjustment mechanism 48a and a front suspension lockout mechanism 48b. Similarly, the electrically controlled rear suspension 50 is preferably conventional, and thus, preferably includes a rear suspension pedal dampening mechanism 50a. The front suspension travel adjustment mechanism 48a receives control signals from the cycle computer 32 to set an amount of travel of the front suspension 48 to LONG/SHORT in a conventional manner. The front suspension lockout mechanism 48b receives control signals from the cycle computer 32 to set front lockout of the front suspension to ON/OFF in a conventional manner. The rear suspension pedal dampening mechanism 50a also receives control signals from the cycle computer 32 to turn rear suspension pedal dampening ON/OFF in a conventional manner. The front suspension travel adjustment mechanism 48a, the front suspension lockout mechanism 48b and the rear suspension pedal dampening mechanism 50a are conventional components, each preferably including a printed circuit board PS to process control signals sent from the cycle computer 32 and a motor M to carry out the control thereof, as seen in FIG. 3. Since these components are conventional, these components will not be discussed and/or illustrated in further detail herein.

Referring now to FIGS. 3-12, the cycle computer 32 is preferably a conventional cycle computer, which includes a controller 52, a display 54, and a cycle computer mounting structure 56, as well as conventional control buttons. The display 54 is configured to selectively display information for the rider to view, for example, speed, time, elapsed time, average speed, top speed, cadence, front suspension modes (amount of travel LONG/SHORT and front lockout ON/OFF), rear suspension mode (pedal dampening ON/OFF), rear derailleur chain plate rotational resistance control (ON/OFF), front/rear shifting synchronization/non-synchronization mode, front/rear shift synchronization (ON/OFF), automatic shifting (mode A, B, or C), cycle computer angle (position/1;2), front and rear derailleur (gear) positions. Any combination of the above information as well as other information can be displayed.

During operation in the front/rear shifting synchronization mode, the controller 52 controls the front and rear derailleurs 38 and 40 to perform shifts in accordance with a predetermined shift synchronization map in a conventional manner. In the predetermined shift synchronization map, there are synchro shift points at which both derailleurs shift at the same time. In the front/rear shifting synchronization mode, the controller 52 controls both the front and rear derailleurs 38 and 40 based on control signals received from one of the front and rear electrical shifters 39 and 41. During operation in the front/rear shift non-synchronization mode, the controller 52 controls the front and rear derailleurs 38 and 40 to perform non-synchronized shifts based on control signals received from one or both of the front and rear electrical shifters 39 and 41. In non-synchronized shifting, both derailleurs do not shift at the same time. In other words, the controller 52 can shift only one of the front and rear derailleurs 38 and 40 based on the operation of the one of the front and rear electrical shifters 39 and 41 in the. The synchronize shifting mode and the non-synchronize shifting mode can be changed by the controller based on operation of the cycle computer 32.

However, regardless of synchronize shifting mode or the non-synchronize shifting mode that is set based on operation of the cycle computer 32, the controller 52 can send control signals to prohibit synchronized shifts (to turn OFF synchronized shifting capability) based on information obtained from the sensors as explained below, or to permit synchronized shifts (to turn ON synchronized shifting capability) based on the sensors as explained below. By such control, the controller 52 does not change the synchronize shifting mode or the non-synchronize shifting mode based on the sensors, but rather only prohibits that both derailleurs 38 and 40 from being shifted at the same time even when in the synchronize shifting mode. In other words, in the tables below, the terms synchro shifting ON/OFF in the tables below should not be interpreted to mean the synchro/non-synchro shifting modes set based on operation of the cycle computer 32. Rather, in the table below, the terms synchro shifting ON/OFF in the tables below should be interpreted to mean permit/prohibit simultaneous shifts.

During rear derailleur chain plate rotational resistance control ON, the rotational resistance of the chain plate of the rear derailleur becomes higher than the rotational resistance during the rear derailleur chain plate rotational resistance control OFF, in a counter clockwise direction as viewed from outside (i.e., the right side) of the bicycle 10. In this embodiment, the rear derailleur chain plate rotational resistance control mechanism 40b is preferably constructed in accordance with U.S. patent application Ser. No. 12/895,705 or EP patent application number 2128014. Therefore, hereafter the rear derailleur chain plate rotational resistance control mechanism 40b is also referred to as a rear derailleur friction mechanism 40b.

The cycle computer mounting structure 56 mounts the cycle computer 32 to the front handlebar 22 in an angularly adjustable manner. Specifically, the cycle computer mounting structure 56 preferably includes a conventional cycle computer angle adjustment mechanism 56a, which is adjustable between at least a first position and a second position in a conventional manner. The first position preferably results in the display 56 being displayed more vertically than in the second position (see FIG. 1 where the first position is illustrated in solid lines and the second position is illustrated in broken lines). The cycle computer angle adjustment mechanism 56a receives control signals from the cycle computer 32 (controller 52) to move the cycle computer 32 to the first or second position) in a conventional manner. The cycle computer angle adjustment mechanism 56a is conventional component preferably including a printed circuit board PS to process control signals sent from the controller 52 and a motor M to carry out the control thereof, as seen in FIG. 3. Since this component is conventional, this component will not be discussed and/or illustrated in further detail herein.

The controller 52 preferably receives signals from the rider sitting sensor 42 (first sensor), the seat height position sensor 44 (second or third sensor), the front wheel sensor 34 and the crank rotation sensor 36 (second or third sensor). Depending on the information sent to the controller 52 from first, second and/or third sensors, the controller 52 sends control commands to the front suspension 48 (front suspension travel adjustment mechanism 48a and/or front suspension lockout mechanism 48b), the rear suspension 50 (rear suspension pedal dampening mechanism 50a), the front derailleur 38 (front derailleur shifting mechanism 38a) the rear derailleur 40 (rear derailleur shifting mechanism 40a and rear derailleur chain plate rotational resistance control mechanism 40b), and the cycle computer angle adjustment mechanism 56a to set/control these components according to the tables illustrated and discussed below. In particular, controller 52 controls the electrically controlled components according to the main process shown in FIG. 4. There are four sets of subroutines A and B illustrated in FIGS. 5-12, which can be used in the main process of FIG. 4.

The controller 52 is conventional, and thus, preferably includes a microcomputer, a computer readable medium (e.g., memory, hard disk, etc.) with one or more executable control programs stored thereon or is communicable with such a computer readable medium in order to execute the control program(s). The controller 52 also preferably includes other conventional components such as an input interface circuit, an output interface circuit, and storage devices such as a ROM (Read Only Memory) device and a RAM (Random Access Memory) device to store programming, data, calculations and/or results. The microcomputer of the controller 52 is programmed to send control commands to and/or receive information from the other electrical components of the bicycle 10, as explained above. It will be apparent to those skilled in the art from this disclosure that the precise structure and algorithms for the controller 52 can be any combination of hardware and software that will carry out the functions of the present invention.

In this embodiment, the bicycle component controlling apparatus 12 includes a first sensor (rider sitting sensor 42), a second sensor (seat height position sensor 44 or crank rotation sensor 36) and the controller 52. The first sensor (rider sitting sensor 42) is configured to detect a first operating condition $S_1$ and to output a first signal indicative of the first operating condition $S_1$. The first operating condition $S_1$ is whether a rider is sitting on a bicycle seat 24 of the bicycle 10. The second sensor (seat height position sensor 44 or crank rotation sensor 36) is configured to detect a second operating condition $S_2$ and to output a second signal indicative of the second operating condition $S_2$. The second operating condition $S_2$ is different from the first operating condition $S_1$. The controller 52 is operatively connected to the first sensor (rider sitting sensor 42) and the second sensor seat height position sensor 44 or crank rotation sensor 36). The controller is configured to generate a component control command $C_1$ to control a bicycle component based on at least the first signal and the second signal.

The component control command $C_1$ can be a front suspension control command. For example, the front suspension control command can be an amount of travel control command and/or a lockout control command. The component control command $C_1$ can be a rear suspension control command. For example, the rear suspension control command can be a pedaling damping control command. The component control command $C_1$ can be a rear derailleur friction control command. The component control command $C_1$ can be a front and rear shifting synchronization control command. The component control command $C_1$ can be an automatic shifting mode control command. The component control command $C_1$ can be a cycle computer angle control command. The component control command $C_1$ can be a single control command for any of the mentioned controls mentioned in this paragraph, or a plurality of component control commands $C_1$ for any combination of the mentioned controls in this paragraph. The tables below illustrate examples of possible control commands.

As explained below, the second sensor can be the seat height position sensor 44 detecting the second condition $S_2$ of subroutines A and B of FIGS. 5-6, or the second sensor can be the crank rotation sensor 36 detecting the second condition $S_2$ of subroutines A and B of FIGS. 7-8.

Figure 5:
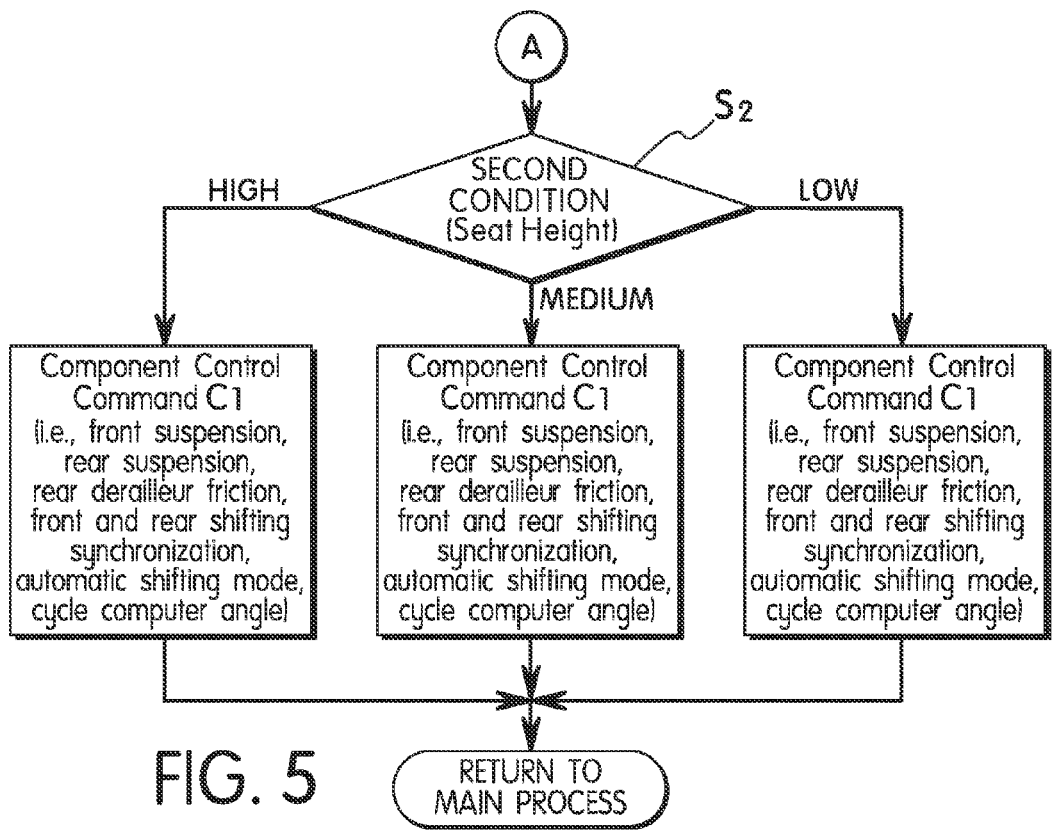
FIG. 5 is a flowchart illustrating a first subroutine process A of the main process illustrated in FIG. 4, with seat height being a second condition in subroutine A.
Figure 6:
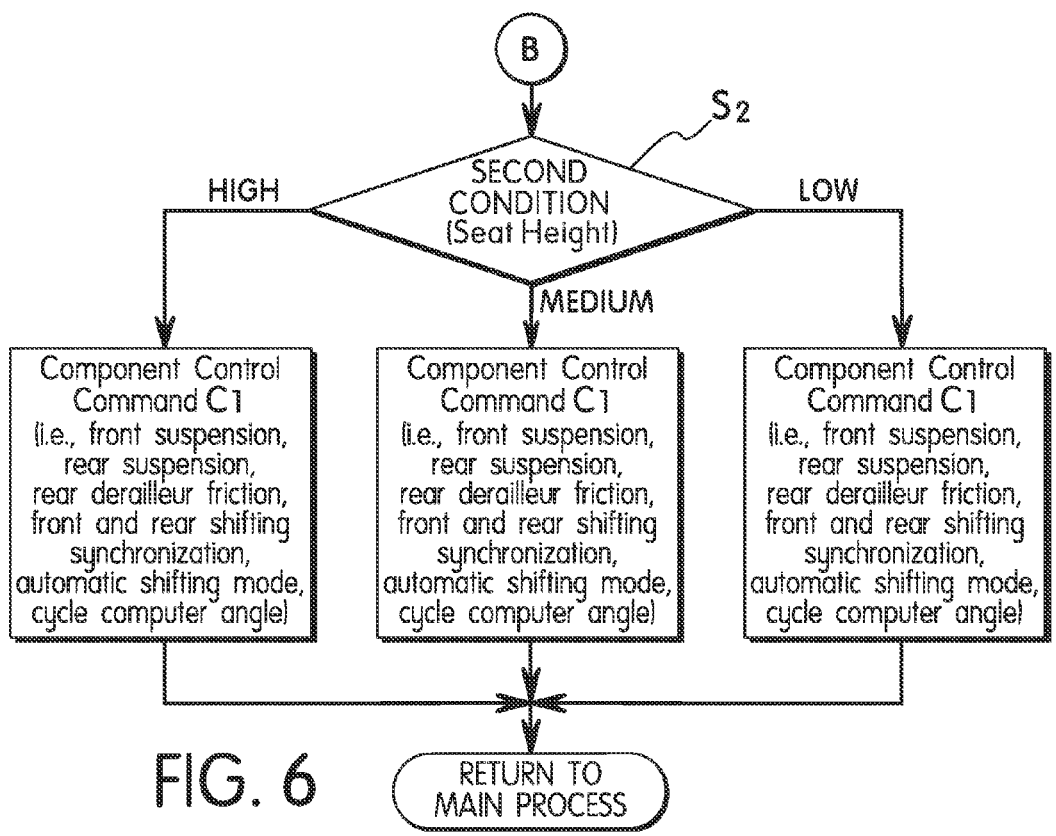
FIG. 6 is a flowchart illustrating a first subroutine process B of the main process illustrated in FIG. 4, with seat height being a second condition in subroutine B.

Referring to FIGS. 5-6, first subroutines A and B are illustrated in accordance with a first control process. In this control process, the second operating condition $S_2$ is a height of the bicycle seat 24. Tables 1-1 and 1-2 illustrate examples of control commands $C_1$ generated by the controller 52 for front suspension travel, front suspension lockout, rear suspension pedal dampening, rear derailleur (RD) friction, front and rear (F/R) shifting synchronization, automatic shifting mode and cycle computer (SC) angle in response to the detected results obtained by the first and second sensors for the first and second conditions $S_1$ and $S_2$. In addition, in accordance with this control process, information from the crank rotation sensor 36 is not used by the controller 52 to control the functions listed in Tables 1-1 and 1-2. Tables 1-1 and 1-2 can be arranged side by side to form a single control table, which illustrates the component control commends $C_1$ for all the electrical components included therein.

TABLE 1-1

| seat height | sit down | front suspension travel | front suspension lockout | rear suspension pedal damping |
|---|---|---|---|---|
| high | yes | SHORT | OFF | ON |
| high | yes | SHORT | OFF | ON |
| high | no | SHORT | OFF | ON |
| high | no | SHORT | ON | ON |
| middle | no | SHORT | OFF | ON |
| low | yes | LONG | OFF | OFF |
| low | yes | LONG | OFF | OFF |
| low | yes | LONG | OFF | ON |
| low | no | LONG | OFF | OFF |
| low | no | LONG | OFF | ON |

TABLE 1-2

| seat height | sit down | RD friction | F/R synchro | automatic shift | SC angle |
|---|---|---|---|---|---|
| high | yes | ON | ON | mode B | 1st position |
| high | yes | OFF | ON | mode B | 1st position |
| high | no | ON | OFF | mode B | 2nd position |
| high | no | OFF | OFF | mode A | 2nd position |
| middle | no | OFF | OFF | mode B | 2nd position |
| low | yes | OFF | ON | mode C | 1st position |
| low | yes | ON | ON | mode C | 1st position |
| low | yes | OFF | ON | mode C | 1st position |
| low | no | ON | OFF | mode C | 2nd position |
| low | no | OFF | OFF | mode C | 2nd position |

Figure 7:
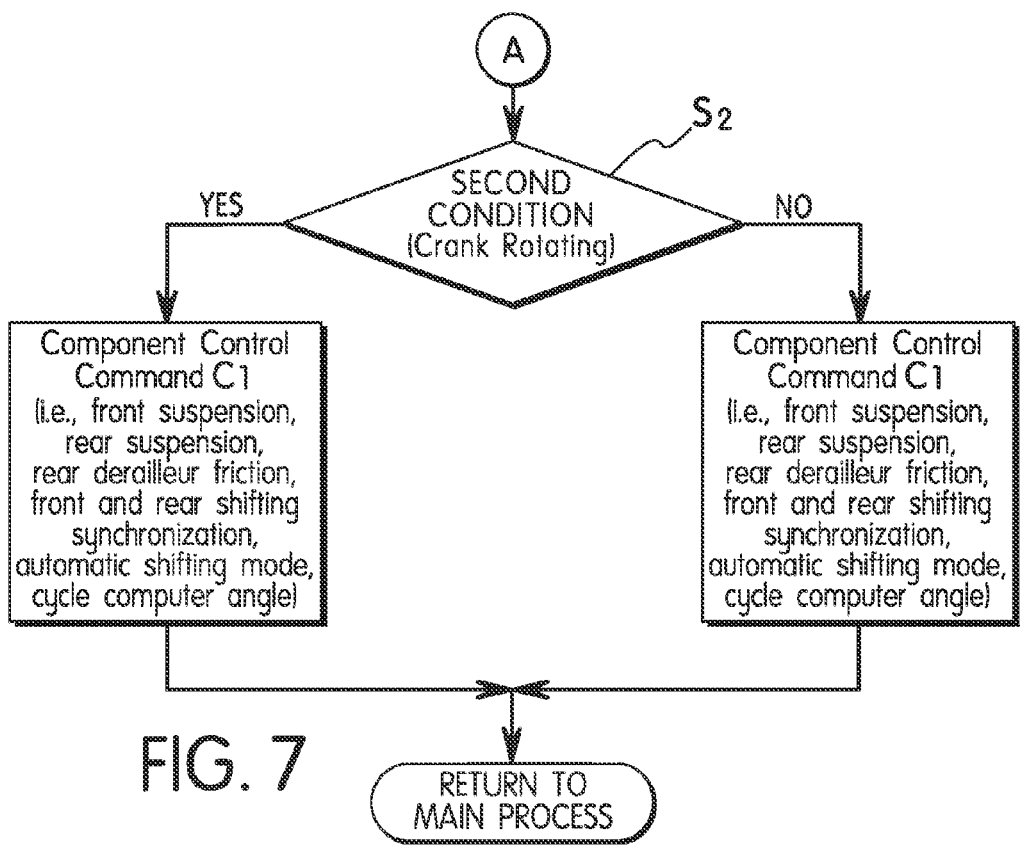
FIG. 7 is a flowchart illustrating a second subroutine process A of the main process illustrated in FIG. 4, with crank rotating being a second condition in subroutine A.
Figure 8:
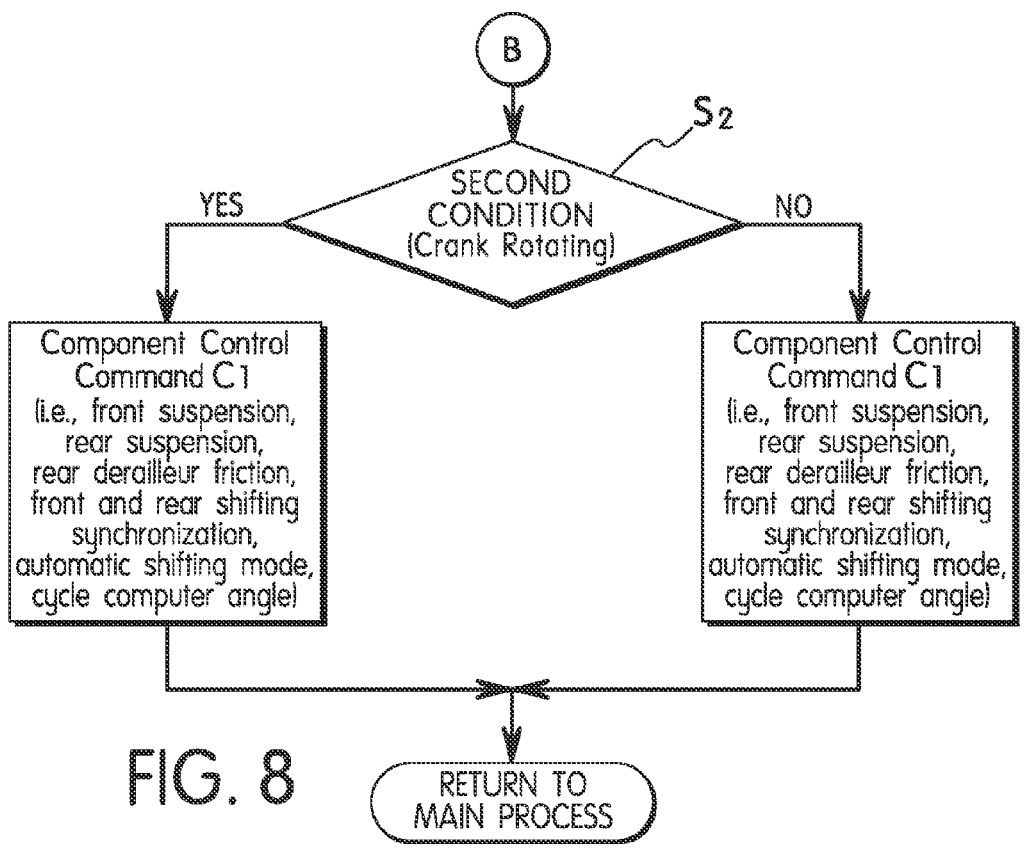
FIG. 8 is a flowchart illustrating a second subroutine process B of the main process illustrated in FIG. 4, with crank rotating being a second condition in subroutine B.

Referring to FIGS. 7-8, subroutines A and B are illustrated in accordance with a second control process. In this control process, the second operating condition $S_2$ is rotation of the bicycle (pedal) crank 26. Tables 2-1 and 2-2 illustrate examples of control commands $C_1$ generated by the controller 52 for front suspension travel, front suspension lockout, rear suspension pedal dampening, rear derailleur (RD) friction, front and rear (F/R) shifting synchronization, automatic shifting mode and cycle computer (SC) angle in response to the detected results obtained by the first and second sensors for the first and second conditions $S_1$ and $S_2$. In addition, in accordance with this control process, information from the seat height position sensor 44 is not used by the controller 52 to control the functions listed in Tables 2-1 and 2-2. Tables 2-1 and 2-2 can be arranged side by side to form a single control table, which illustrates the component control commands $C_1$ for all the electrical components included therein.

TABLE 2-1

| sit down | pedaling | front suspension travel | front suspension lockout | rear suspension pedal damping |
|---|---|---|---|---|
| yes | no | SHORT | OFF | ON |
| yes | yes | SHORT | OFF | ON |
| no | no | SHORT | OFF | ON |
| no | yes | SHORT | ON | ON |
| no | yes | SHORT | OFF | ON |
| yes | no | LONG | OFF | OFF |
| yes | no | LONG | OFF | OFF |
| yes | yes | LONG | OFF | ON |
| no | no | LONG | OFF | OFF |
| no | yes | LONG | OFF | ON |

TABLE 2-2

| sit down | pedaling | RD friction | F/R synchro | automatic shift | SC angle |
|---|---|---|---|---|---|
| yes | no | ON | ON | mode B | 1st position |
| yes | yes | OFF | ON | mode B | 1st position |
| no | no | ON | OFF | mode B | 2nd position |
| no | yes | OFF | OFF | mode A | 2nd position |
| no | yes | OFF | OFF | mode B | 2nd position |
| yes | no | OFF | ON | mode C | 1st position |
| yes | no | ON | ON | mode C | 1st position |
| yes | yes | OFF | ON | mode C | 1st position |
| no | no | ON | OFF | mode C | 2nd position |
| no | yes | OFF | OFF | mode C | 2nd position |

Figure 9:
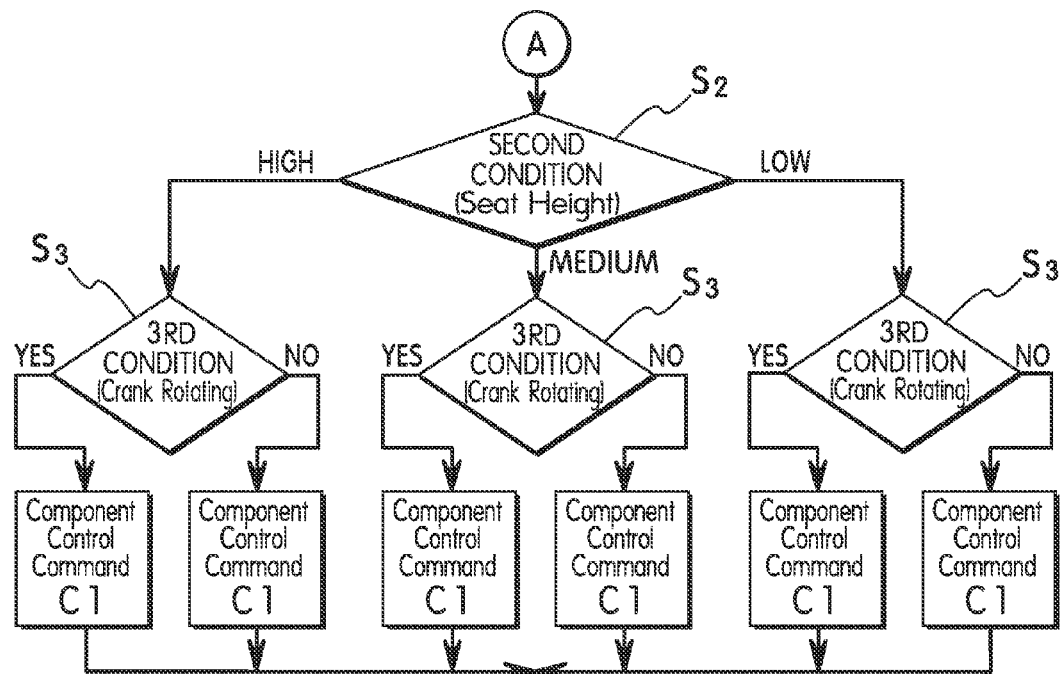
FIG. 9 is a flowchart illustrating a third subroutine process A of the main process illustrated in FIG. 4, with seat height being a second condition and with crank rotating being a third condition in subroutine A.
Figure 10:
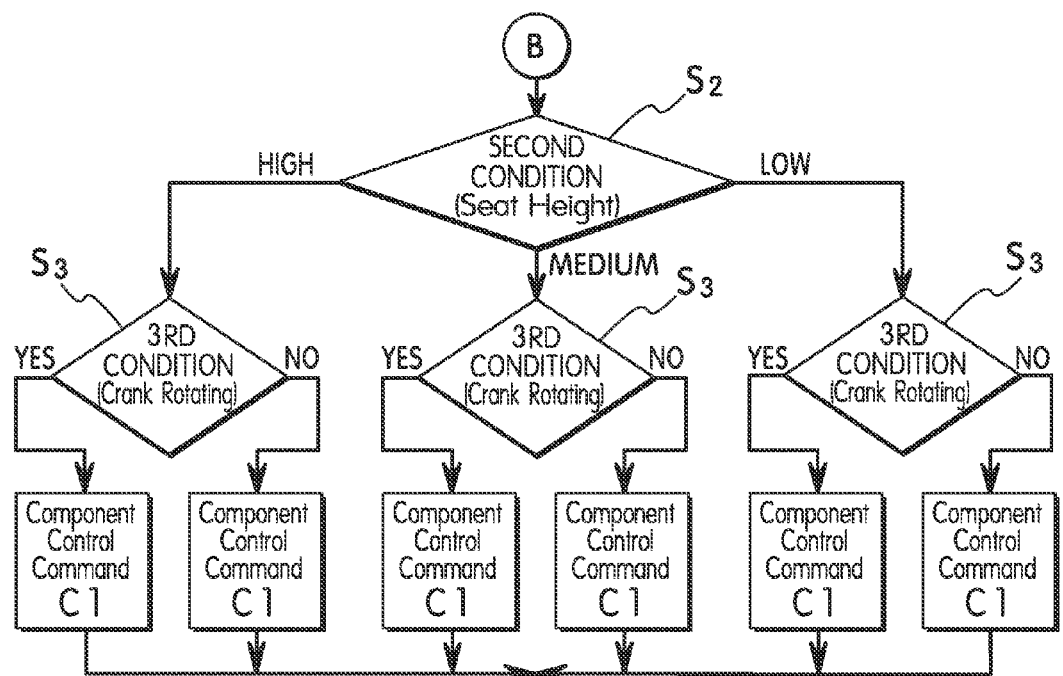
FIG. 10 is a flowchart illustrating a third subroutine process B of the main process illustrated in FIG. 4, with seat height being a second condition and with crank rotating being a third condition in subroutine B.

Referring to FIGS. 9-10, subroutines A and B are illustrated in accordance with a third control process. In a case where the second sensor is the seat height position sensor 44 detecting the second condition $S_2$ of subroutines A and B of FIGS. 5-6, a third sensor (crank rotation sensor 36) can be further provided and the electrical components can be controlled in accordance with FIGS. 9-10. In accordance with this control process, the bicycle component controlling apparatus 12 further includes a third sensor (crank rotation sensor 36) configured to detect a third operating condition $S_3$ and to output a third signal indicative of the third operating condition $S_3$. The third operating condition $S_3$ is different from the first and second operating conditions $S_1$ and $S_2$. The controller 52 is operatively connected to the third sensor (crank rotation sensor 36). The controller 52 is further configured to generate the component control command $C_1$ based on the first, second and third signals. Thus, in this control process, the second operating condition $S_2$ is a height of the bicycle seat 24 and the third operating condition $S_3$ is rotation of a bicycle crank 26.

Table 3-1 illustrates examples of typical road and rider situations for the detected results from the first, second and third sensors (first second and third conditions $S_1$, $S_2$ and $S_3$).

TABLE 3-1

| road situation | seat height | sit down | pedaling | Rider situation |
|---|---|---|---|---|
| level land/uphill | high | yes | no | |
| level land/uphill | high | yes | yes | |
| level land/uphill | high | no | no | cross gap |
| level land/uphill | high | no | yes | dancing |
| level land/uphill/downhill | middle | no | yes | cross gap |
| downhill | low | yes | no | relax in downhill |
| downhill | low | yes | no | downhill in saving power |
| downhill | low | yes | yes | short additional pedal in downhill |
| downhill | low | no | no | downhill |
| downhill | low | no | yes | short uphill in downhill |

Tables 3-2 and 3-3 illustrate examples of control commands $C_1$ generated by the controller 52 for front suspension travel, front suspension lockout, rear suspension pedal dampening, rear derailleur (RD) friction, front and rear (F/R) shifting synchronization, automatic shifting mode and cycle computer (SC) angle in response to the detected results obtained by the first, second and third sensors for the first, second and third conditions $S_1$, $S_2$ and $S_3$. Tables 3-2 and 3-3 can be arranged side by side to form a single control table, which illustrates the component control commends $C_1$ for all the electrical components included therein.

TABLE 3-2

| seat height | sit down | pedaling | front suspension travel | front suspension lockout | rear suspension pedal damping |
|---|---|---|---|---|---|
| high | yes | no | SHORT | OFF | ON |
| high | yes | yes | SHORT | OFF | ON |
| high | no | no | SHORT | OFF | ON |
| high | no | yes | SHORT | ON | ON |
| middle | no | yes | SHORT | OFF | ON |
| low | yes | no | LONG | OFF | OFF |
| low | yes | no | LONG | OFF | OFF |
| low | yes | yes | LONG | OFF | ON |
| low | no | no | LONG | OFF | OFF |
| low | no | yes | LONG | OFF | ON |

TABLE 3-3

| seat height | sit down | pedaling | RD friction | F/R synehro | automatic shift | SC angle |
|---|---|---|---|---|---|---|
| high | yes | no | ON | ON | mode B | 1st position |
| high | yes | yes | OFF | ON | mode B | 1st position |
| high | no | no | ON | OFF | mode B | 2nd position |
| high | no | yes | OFF | OFF | mode A | 2nd position |
| middle | no | yes | OFF | OFF | mode B | 2nd position |
| low | yes | no | OFF | ON | mode C | 1st position |
| low | yes | no | ON | ON | mode C | 1st position |
| low | yes | yes | OFF | ON | mode C | 1st position |
| low | no | no | ON | OFF | mode C | 2nd position |
| low | no | yes | ON | ON | mode C | 2nd position |

Figure 11:
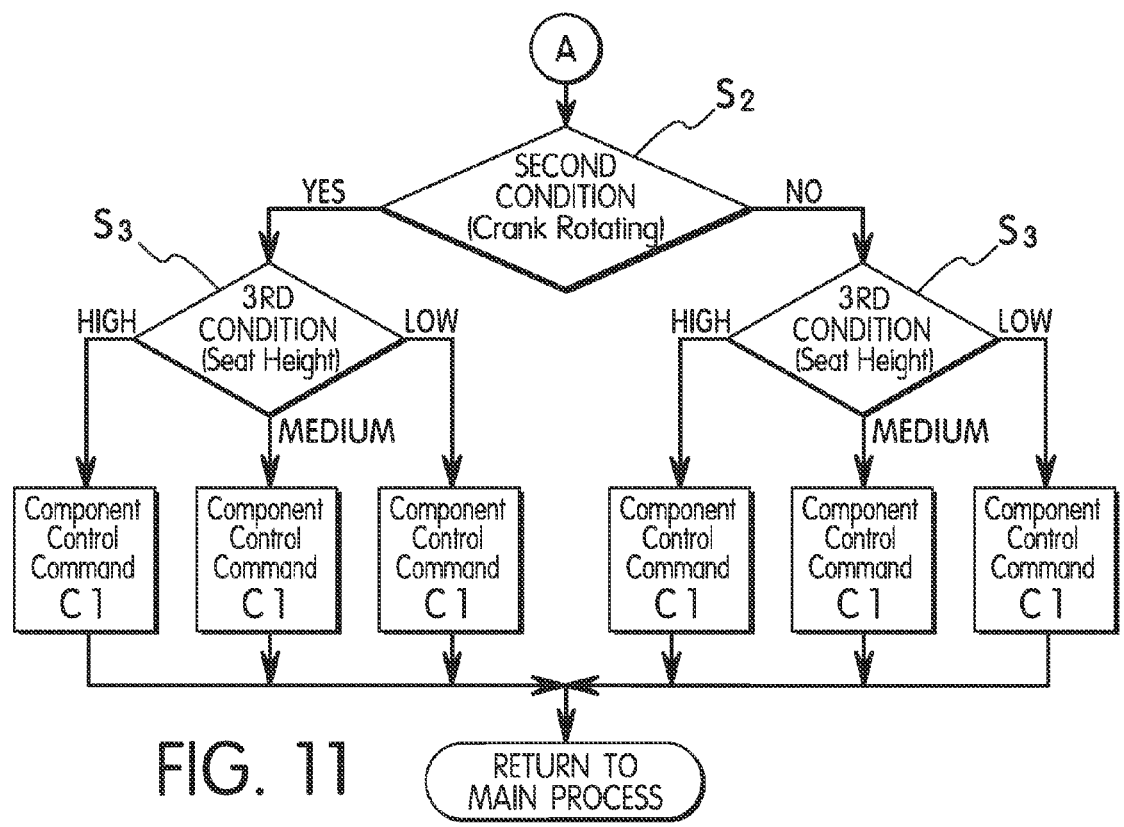
FIG. 11 is a flowchart illustrating a fourth subroutine process A of the main process illustrated in FIG. 4, with crank rotating being a second condition and with seat height being a third condition in subroutine A.
Figure 12:
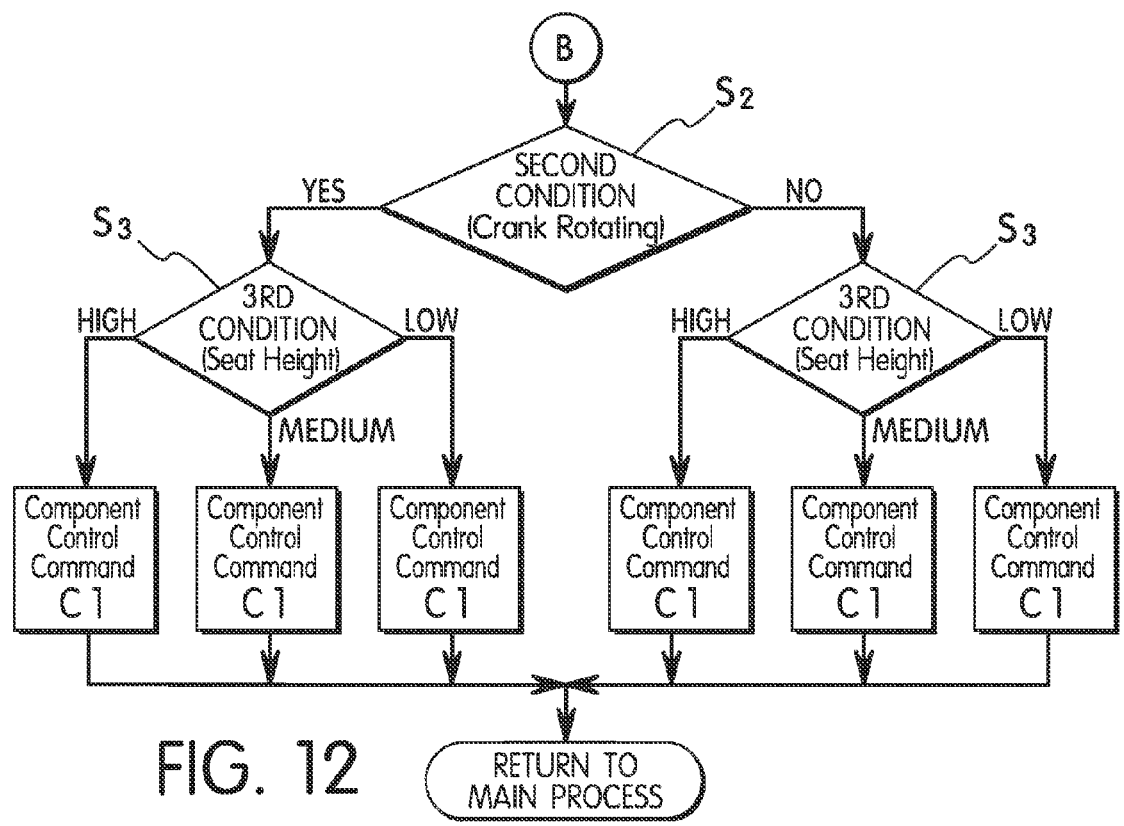
FIG. 12 is a flowchart illustrating a fourth subroutine process B of the main process illustrated in FIG. 4, with crank rotating being a second condition and with seat height being a third condition in subroutine B.
Figure 13:
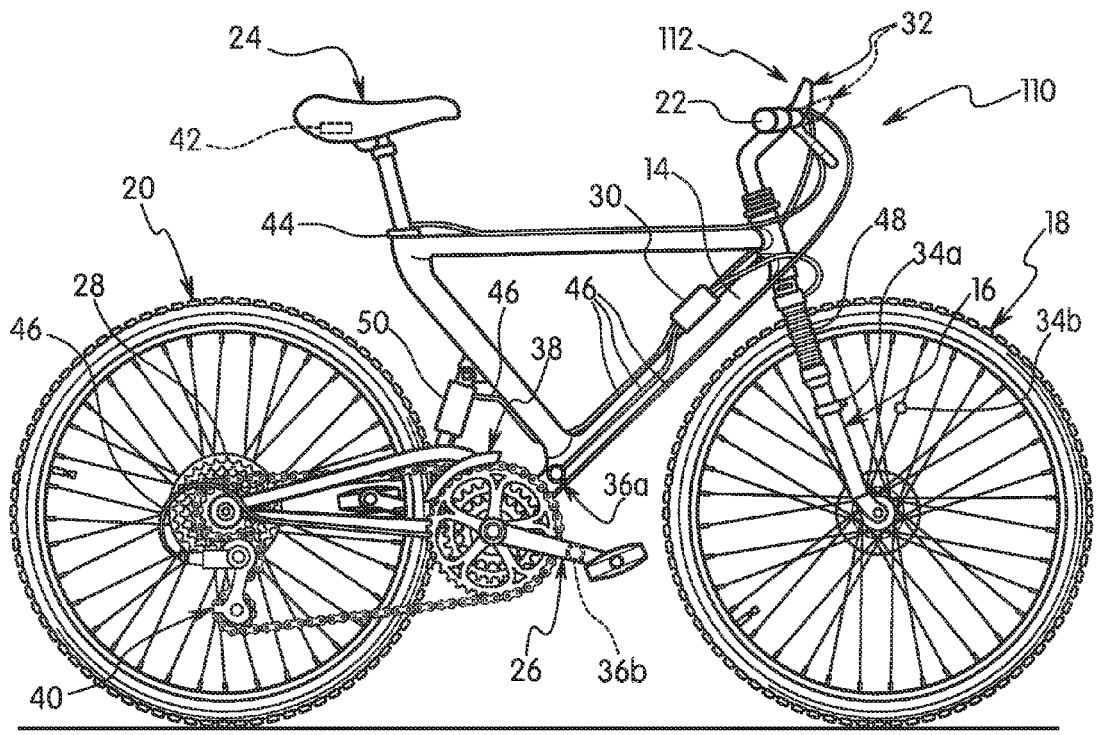
FIG. 13 is a side elevational view of a bicycle that is equipped with a bicycle component controlling apparatus in accordance with a second embodiment.
Figure 14:
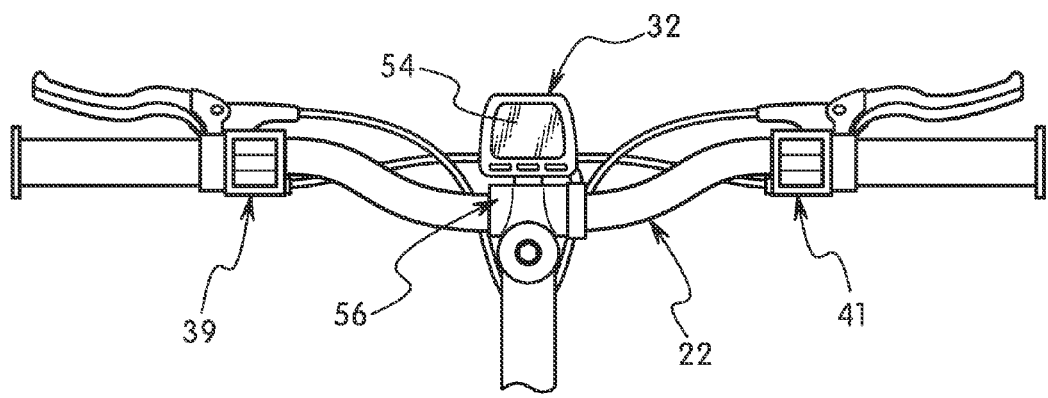
FIG. 14 is a top plan view of the handlebars of the bicycle illustrated in FIG. 13, with a cycle computer, electrical shifters and traditional brake levers mounted thereto.
Figure 15:
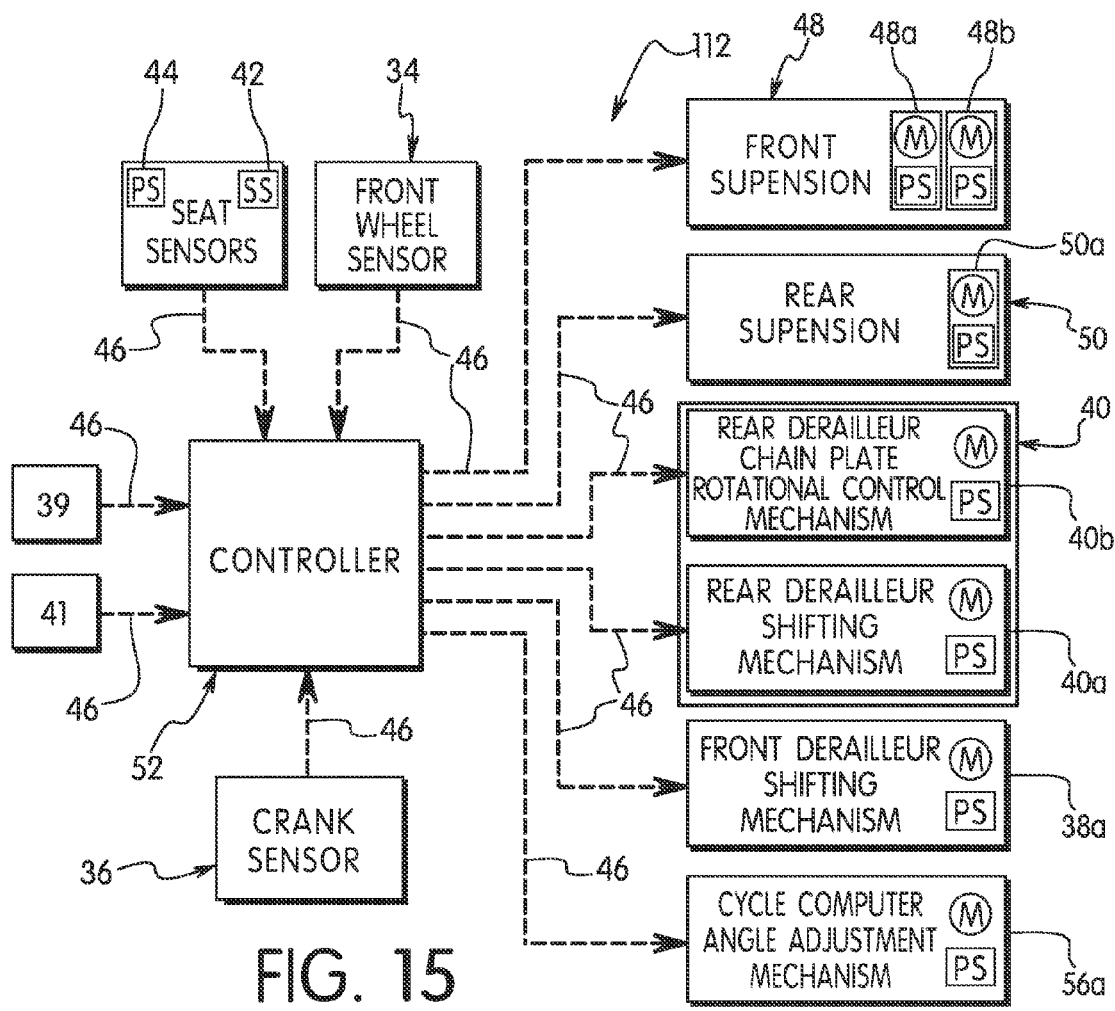
FIG. 15 is a block diagram of the parts of the bicycle component controlling apparatus illustrated in FIG. 13.
Figure 16:
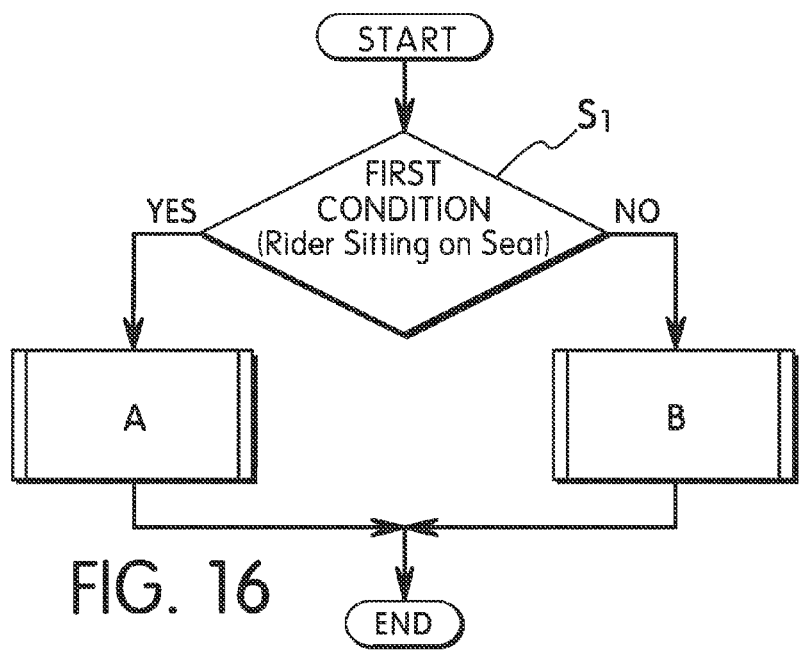
FIG. 16 is a flowchart illustrating a main control process of the bicycle component controlling apparatus.

Referring to FIGS. 11-12, subroutines A and B are illustrated in accordance with a fourth control process. In a case where the second sensor is the crank rotation sensor 36 detecting the second condition $S_2$ of subroutines A and B of FIGS. 7-8, a third sensor (seat height position sensor 44). The result of these subroutines is the same as subroutines 9-10. However, the order of the second and third conditions $S_2$ and $S_3$ is reversed. Therefore, in this control process, the second operating condition $S_2$ is rotation of a bicycle crank and the third condition $S_3$ is a height of the bicycle seat 24. Since this fourth control process has the same results as the third control process above, this fourth control process will not be explained in further detail herein. Rather, it will be apparent to those skilled in the art from this disclosure that the descriptions above with respect to the third control process also apply to this fourth control process, the order of the second and third conditions $S_2$ and $S_3$ is reversed.

Second Embodiment

Referring now to FIGS. 13-25, a bicycle 110 equipped with a bicycle component controlling apparatus 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. However, it will be apparent to those skilled in the art from this disclosure that the descriptions and illustrations of the parts of the first embodiment also apply to this second embodiment, except as explained and illustrated herein.

Referring initially to FIGS. 13-16, the bicycle 110 and the bicycle component controlling apparatus 112 basically include the same parts as the first embodiment, and thus use like reference numerals. However, in this second embodiment, bicycle components controls (i.e., rear derailleur friction control, front and rear shifting synchronization control and cycle computer angle control) other than an automatic transmission and a suspension are controlled. In particular, in accordance with this second embodiment, bicycle component control commands $C_2$ are generated by the controller 52 for rear derailleur (RD) friction, front and rear (F/R) shifting synchronization, and cycle computer (SC), but not for front suspension travel, front suspension lockout, rear suspension pedal dampening and automatic shifting mode.

Thus in this embodiment, the front and rear electrical shifters 39 and 41 mounted on the handlebar 22 are used to perform manual electrical shifting rather than the controller 52 controlling automatic shifting like the first embodiment. In additional, the cycle computer 32 includes buttons to manually control the front and rear suspensions 48 and 50 rather than the controller 52 controlling the suspensions 48 and 50 like the first embodiment.

Figure 17:
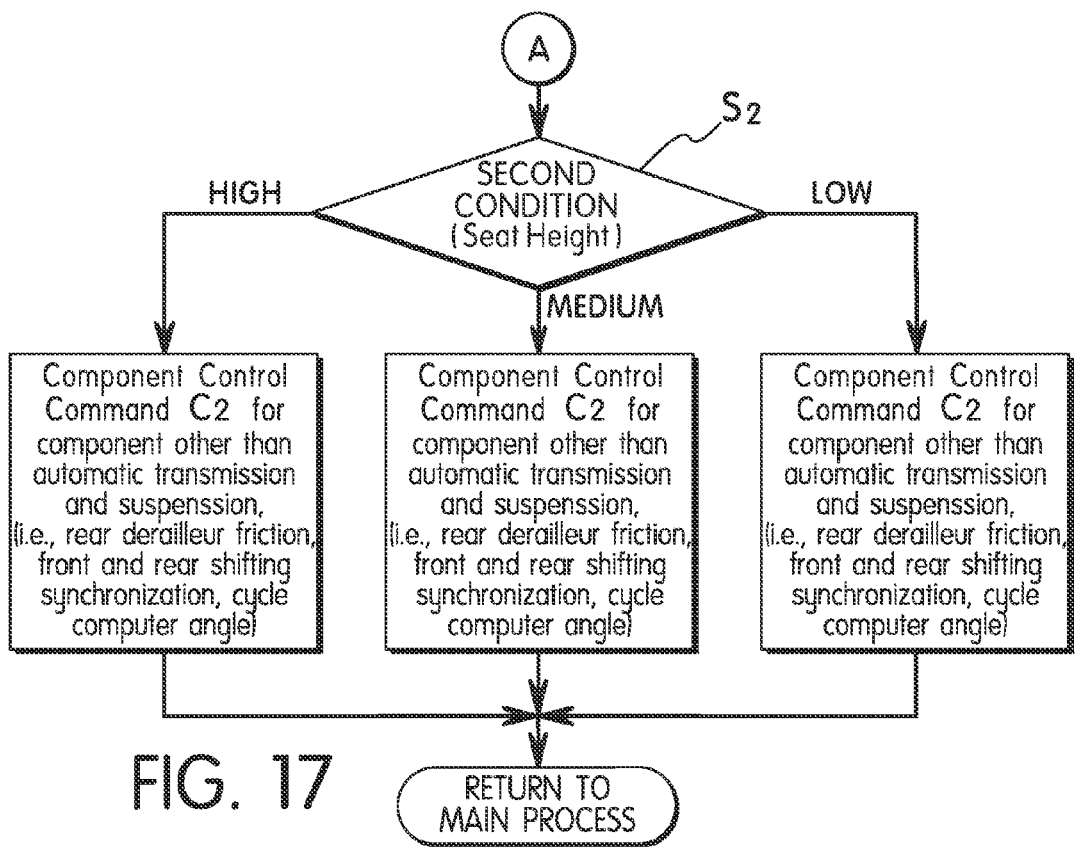
FIG. 17 is a flowchart illustrating a first subroutine process A of the main process illustrated in FIG. 16, with seat height being a second condition in subroutine A.
Figure 18:
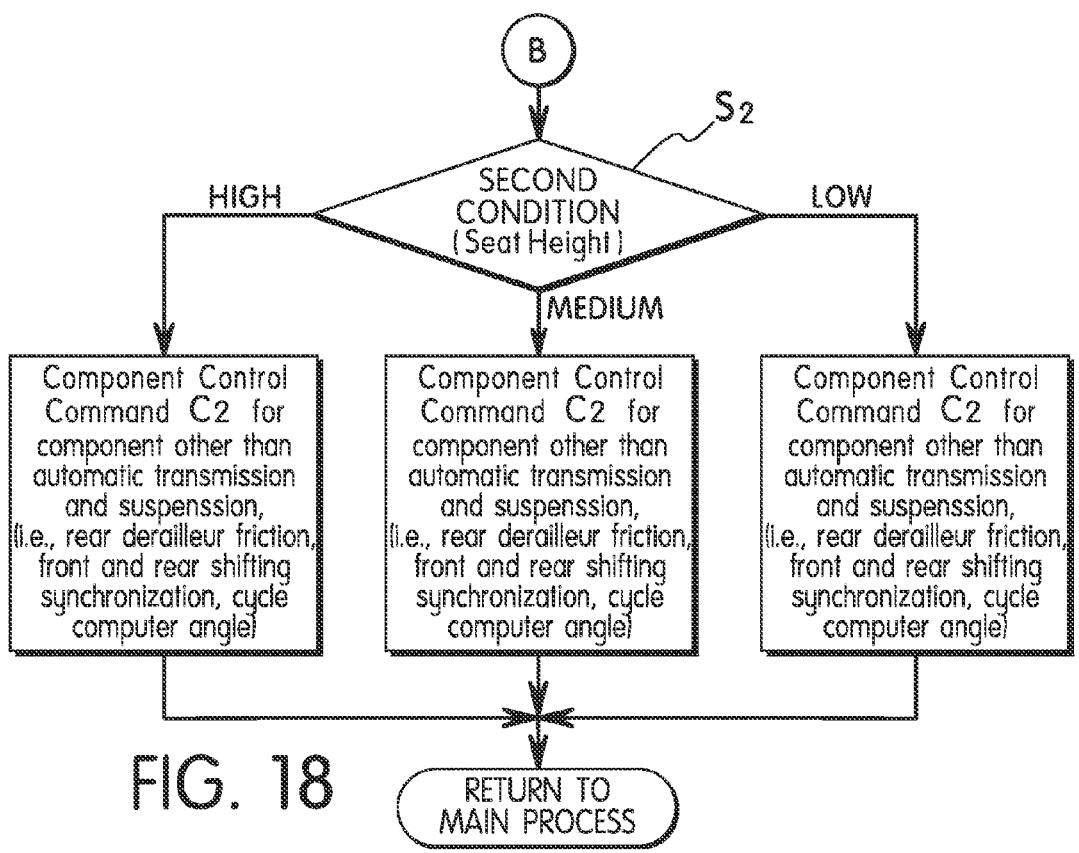
FIG. 18 is a flowchart illustrating a first subroutine process B of the main process illustrated in FIG. 16, with seat height being a second condition in subroutine B.

Referring to FIGS. 17-18, subroutines A and B are illustrated in accordance with a first control process of the second embodiment. This control process is identical to that explained above with respect to FIGS. 5-6, except bicycle component other than an automatic transmission and a suspension are controlled. In particular, bicycle component control commands $C_2$ are generated by the controller 52 for rear derailleur (RD) friction, front and rear (F/R) shifting synchronization, and cycle computer (SC) as shown in Table 4 in response to the detected results of the first and second sensors resulting in the first and second conditions $S_1$ and $S_2$ shown in table 4-1. Table 4 illustrates examples of control commands $C_2$ generated by the controller 52 for rear derailleur (RD) friction, front and rear (F/R) shifting synchronization, and cycle computer (SC) angle in response to the detected results obtained by the first, second and third sensors for the first and second conditions $S_1$ and $S_2$.

TABLE 4

| seat height | sit down | RD friction | F/R synchro | SC angle |
| --- | --- | --- | --- | --- |
| high | yes | ON | ON | 1st position |
| high | yes | OFF | ON | 1st position |
| high | no | ON | OFF | 2nd position |
| high | no | OFF | OFF | 2nd position |
| middle | no | OFF | OFF | 2nd position |
| low | yes | OFF | ON | 1st position |
| low | yes | ON | ON | 1st position |
| low | yes | OFF | ON | 1st position |
| low | no | ON | OFF | 2nd position |
| low | no | OFF | OFF | 2nd position |

Figure 19:
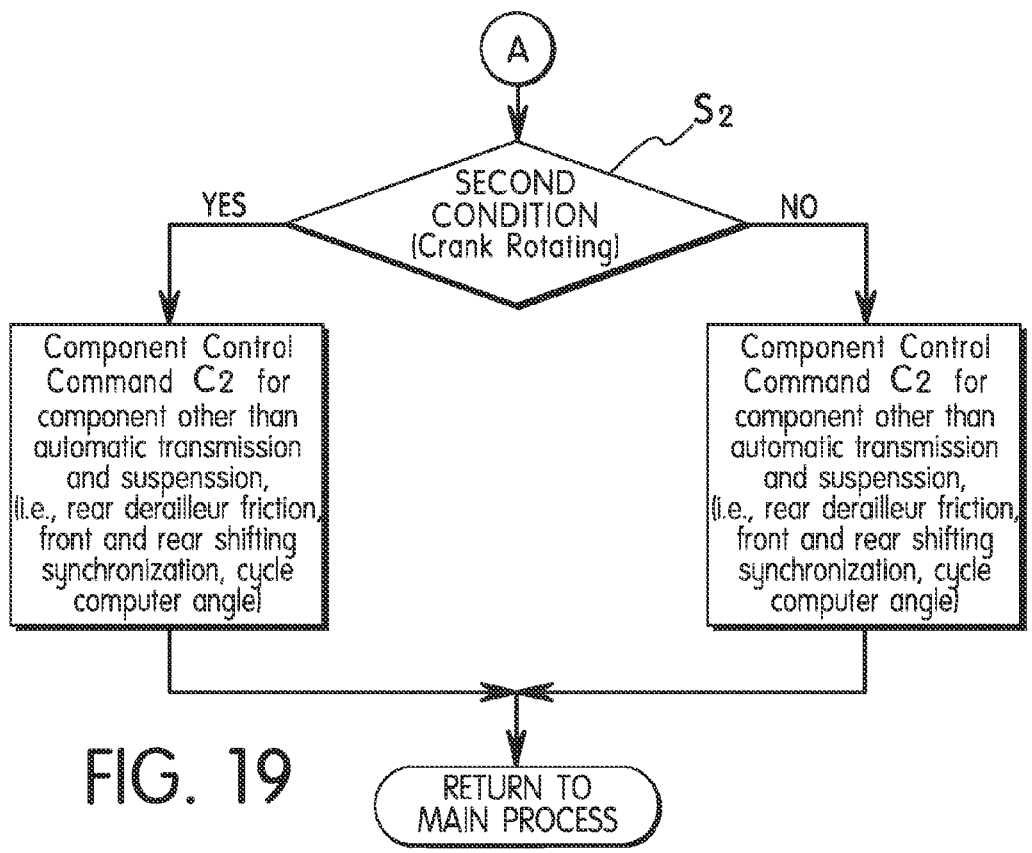
FIG. 19 is a flowchart illustrating a second subroutine process A of the main process illustrated in FIG. 16, with crank rotating being a second condition in subroutine A.
Figure 20:
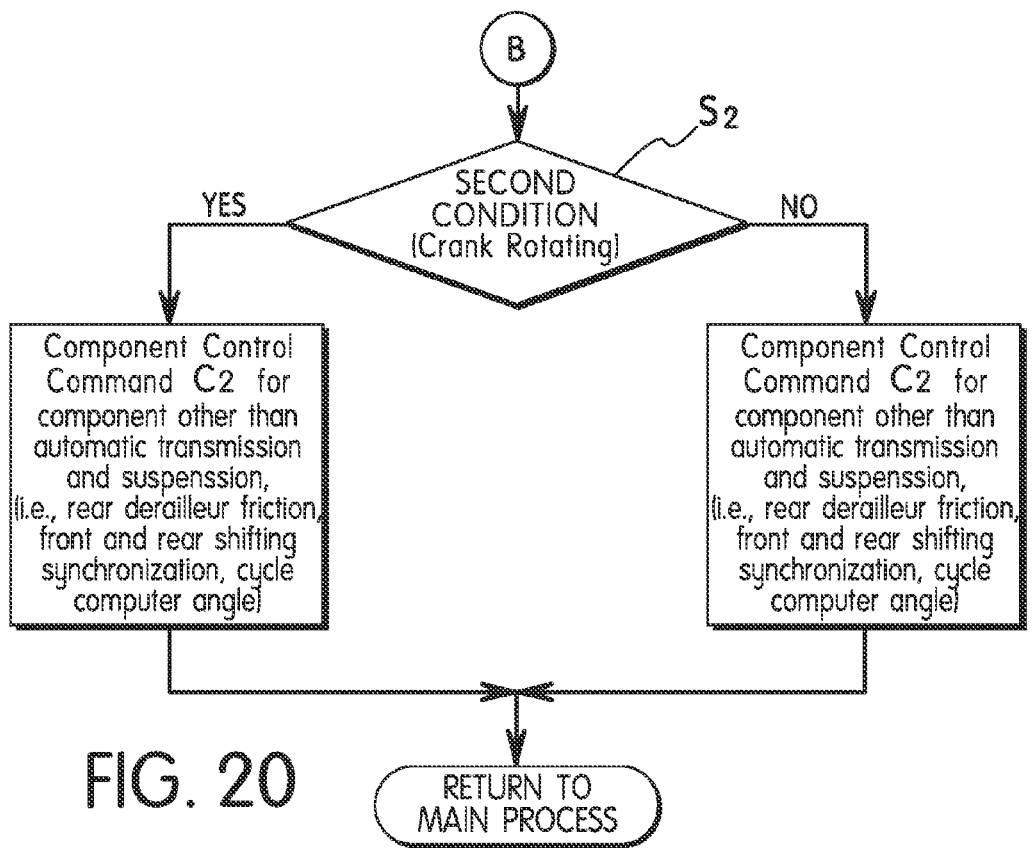
FIG. 20 is a flowchart illustrating a second subroutine process B of the main process illustrated in FIG. 16, with crank rotating being a second condition in subroutine B.

Referring to FIGS. 19-20, subroutines A and B are illustrated in accordance with a second control process of the second embodiment. This control process is identical to that explained above with respect to FIGS. 7-8, except bicycle component other than an automatic transmission and a suspension are controlled. In particular, bicycle component control commands $C_2$ are generated by the controller 52 for rear derailleur (RD) friction, front and rear (F/R) shifting synchronization, and cycle computer (SC) angle as shown in Table 5 in response to the detected results of the first and second sensors resulting in the first and second conditions $S_1$ and $S_2$ shown in Table 5. Thus, Table 5 illustrates examples of control commands $C_2$ generated by the controller 52 for rear derailleur (RD) friction, front and rear (F/R) shifting synchronization, and cycle computer (SC) angle in response to the detected results obtained by the first, second and third sensors for the first and second conditions $S_1$ and $S_2$.

TABLE 5

| sit down | pedaling | RD friction | F/R synchro | SC angle |
| --- | --- | --- | --- | --- |
| yes | no | ON | ON | 1st position |
| yes | yes | OFF | ON | 1st position |
| no | no | ON | OFF | 2nd position |
| no | yes | OFF | OFF | 2nd position |
| no | yes | OFF | OFF | 2nd position |
| yes | no | OFF | ON | 1st position |
| yes | no | ON | ON | 1st position |
| yes | yes | OFF | ON | 1st position |
| no | no | ON | OFF | 2nd position |
| no | yes | OFF | OFF | 2nd position |

Figure 21:
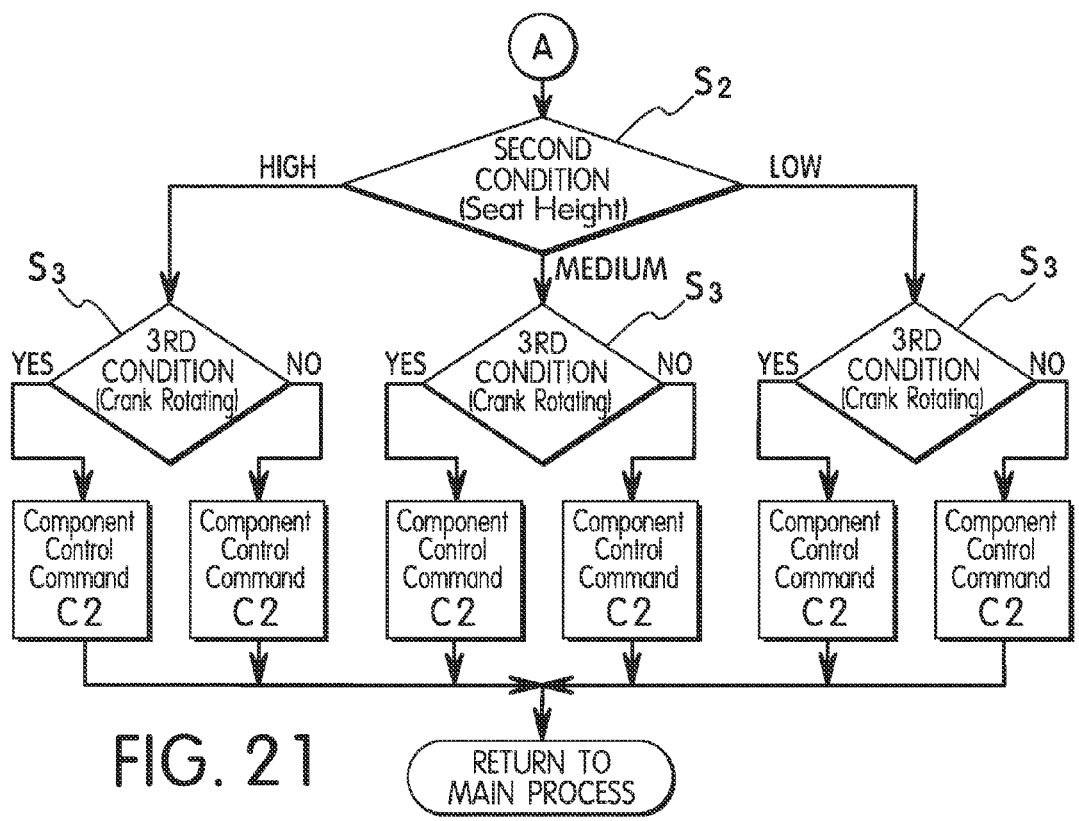
FIG. 21 is a flowchart illustrating a third subroutine process A of the main process illustrated in FIG. 16, with seat height being a second condition and with crank rotating being a third condition in subroutine A.
Figure 22:
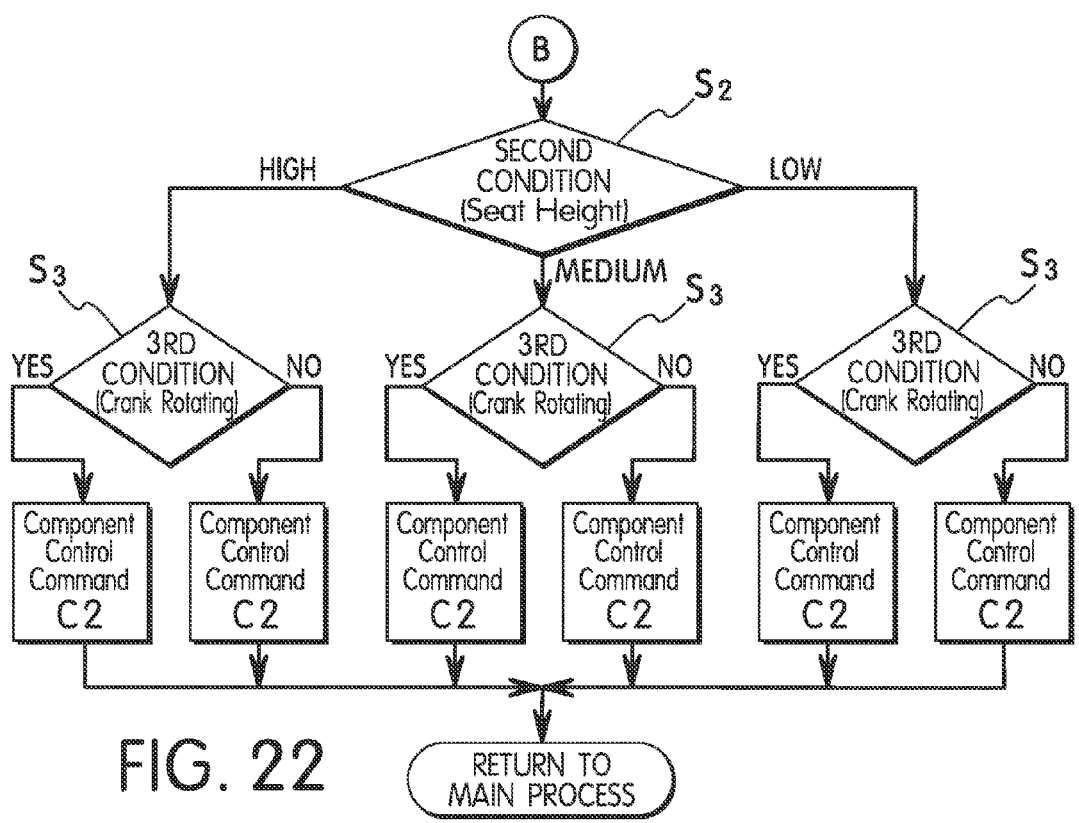
FIG. 22 is a flowchart illustrating a third subroutine process B of the main process illustrated in FIG. 16, with seat height being a second condition and with crank rotating being a third condition in subroutine B.

Referring to FIGS. 21-22, subroutines A and B are illustrated in accordance with a third control process of the second embodiment. This control process is identical to that explained above with respect to FIGS. 9-10, except bicycle component other than an automatic transmission and a suspension are controlled. Table 6-1 illustrates examples of typical road and rider situations for the detected results from the first, second and third sensors (first second and third conditions $S_1$, $S_2$ and $S_3$).

TABLE 6-1

| road situation | seat height | sit down | pedaling | Rider situation |
| --- | --- | --- | --- | --- |
| level land/uphill | high | yes | no | — |
| level land/uphill | high | yes | yes | — |
| level land/uphill | high | no | no | cross gap |
| level land/uphill | high | no | yes | dancing |
| level land/uphill/downhill | middle | no | yes | cross gap |
| downhill | low | yes | no | relax in downhill |
| downhill | low | yes | no | downhill in saving power |
| downhill | low | yes | yes | short additional pedal in downhill |
| downhill | low | no | no | downhill |
| downhill | low | no | yes | short uphill in downhill |

Referring still to FIGS. 21-22, bicycle component control commands $C_2$ are generated by the controller 52 for rear derailleur (RD) friction, front and rear (F/R) shifting synchronization, and cycle computer (SC) angle as shown in Table 6-2 in response to the detected results of the first, second and third sensors resulting in the first, second and third conditions $S_1$, $S_2$ and $S_3$ shown in table 6-2. Thus, Table 6-2 illustrates examples of control commands $C_2$ generated by the controller 52 for rear derailleur (RD) friction, front and rear (F/R) shifting synchronization, and cycle computer (SC) angle in response to the detected results obtained by the first, second and third sensors for the first, second and third conditions $S_1$, $S_2$ and $S_3$.

TABLE 6-2

| seat height | sit down | pedaling | RD friction | F/R synchro | SC angle |
| --- | --- | --- | --- | --- | --- |
| high | yes | no | ON | ON | 1st position |
| high | yes | yes | OFF | ON | 1st position |
| high | no | no | ON | OFF | 2nd position |
| high | no | yes | OFF | OFF | 2nd position |
| middle | no | yes | OFF | OFF | 2nd position |
| low | yes | no | OFF | ON | 1st position |
| low | yes | no | ON | ON | 1st position |
| low | yes | yes | OFF | ON | 1st position |
| low | no | no | ON | OFF | 2nd position |
| low | no | yes | OFF | OFF | 2nd position |

Figure 23:
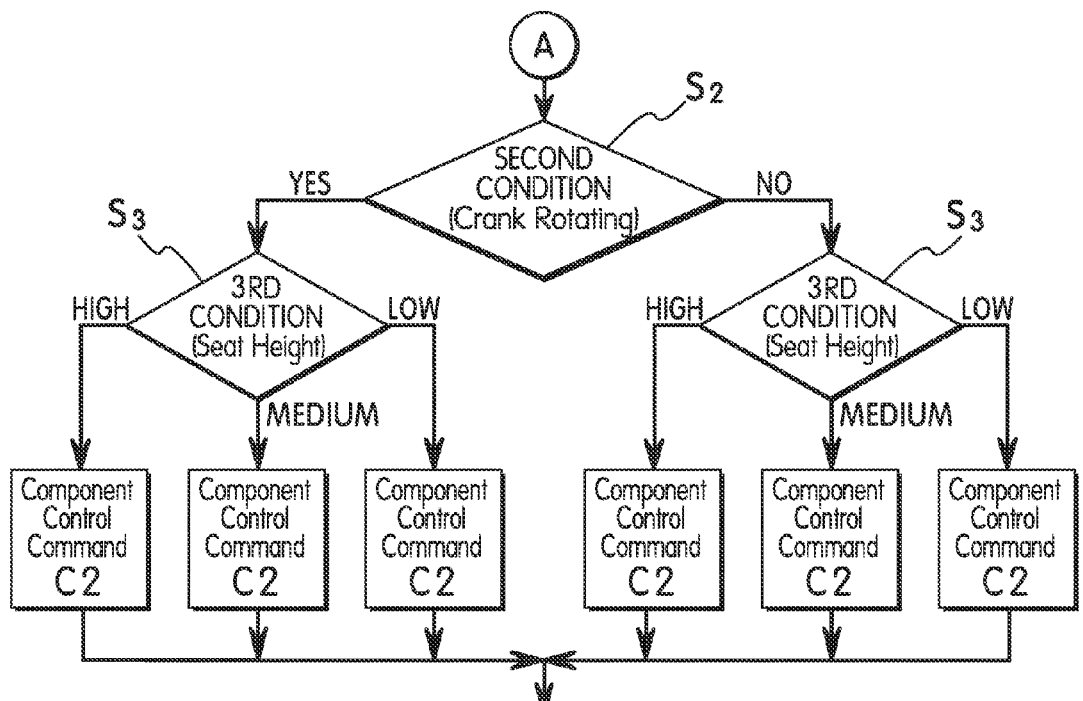
FIG. 23 is a flowchart illustrating a fourth subroutine process A of the main process illustrated in FIG. 16, with crank rotating being a second condition and with seat height being a third condition in subroutine A.
Figure 24:
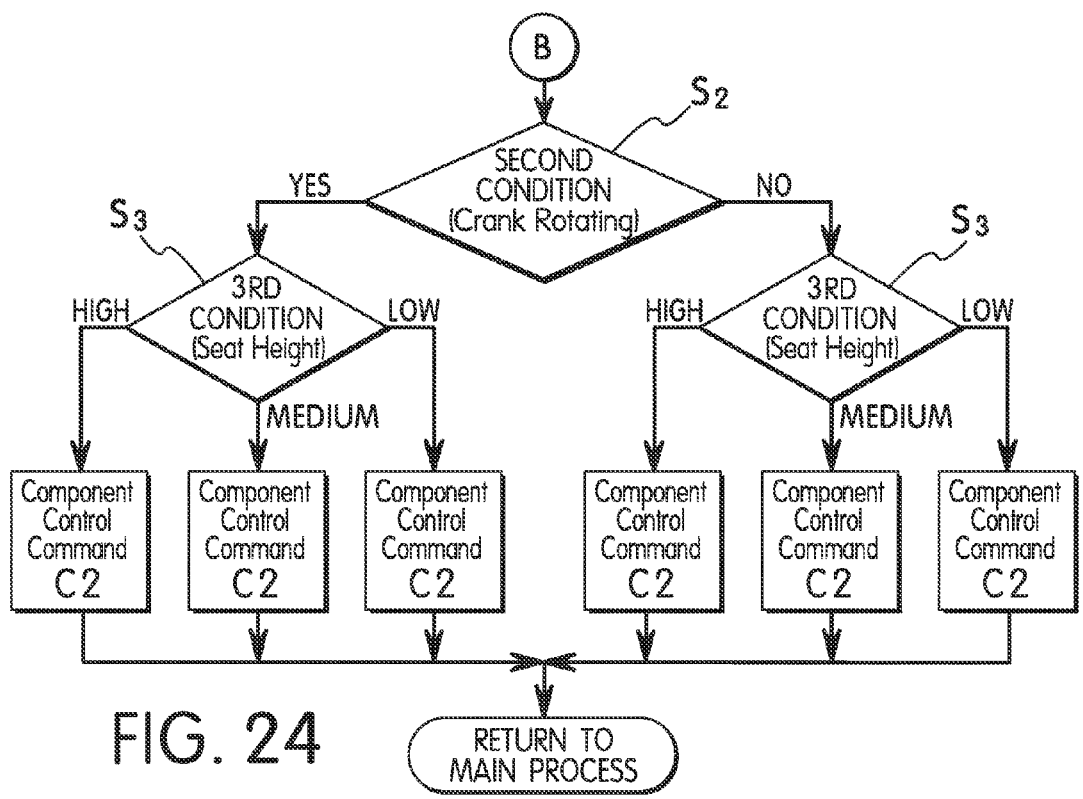
FIG. 24 is a flowchart illustrating a fourth subroutine process B of the main process illustrated in FIG. 16, with crank rotating being a second condition and with seat height being a third condition in subroutine B.

Referring still to FIGS. 23-24, subroutines A and B are illustrated in accordance with a fourth control process of the second embodiment. This control process is identical to that explained above with respect to FIGS. 11-12, except bicycle component other than an automatic transmission and a suspension are controlled. Therefore, in a case where the second sensor is the crank rotation sensor 36 detecting the second condition $S_2$ of subroutines A and B of FIGS. 19-20, a third sensor (seat height position sensor 44). The result of these subroutines is the same as subroutines 21-22. However, the order of the second and third conditions $S_2$ and $S_3$ is reversed. Therefore, in this control process, the second operating condition $S_2$ is rotation of a bicycle crank and the third condition $S_3$ is a height of the bicycle seat 24. Since this fourth control process has the same results as the third control process above, this fourth control process will not be explained in further detail herein. Rather, it will be apparent to those skilled in the art from this disclosure that the descriptions above with respect to the third control process also apply to this fourth control process, the order of the second and third conditions $S_2$ and $S_3$ is reversed.

Figure 25:
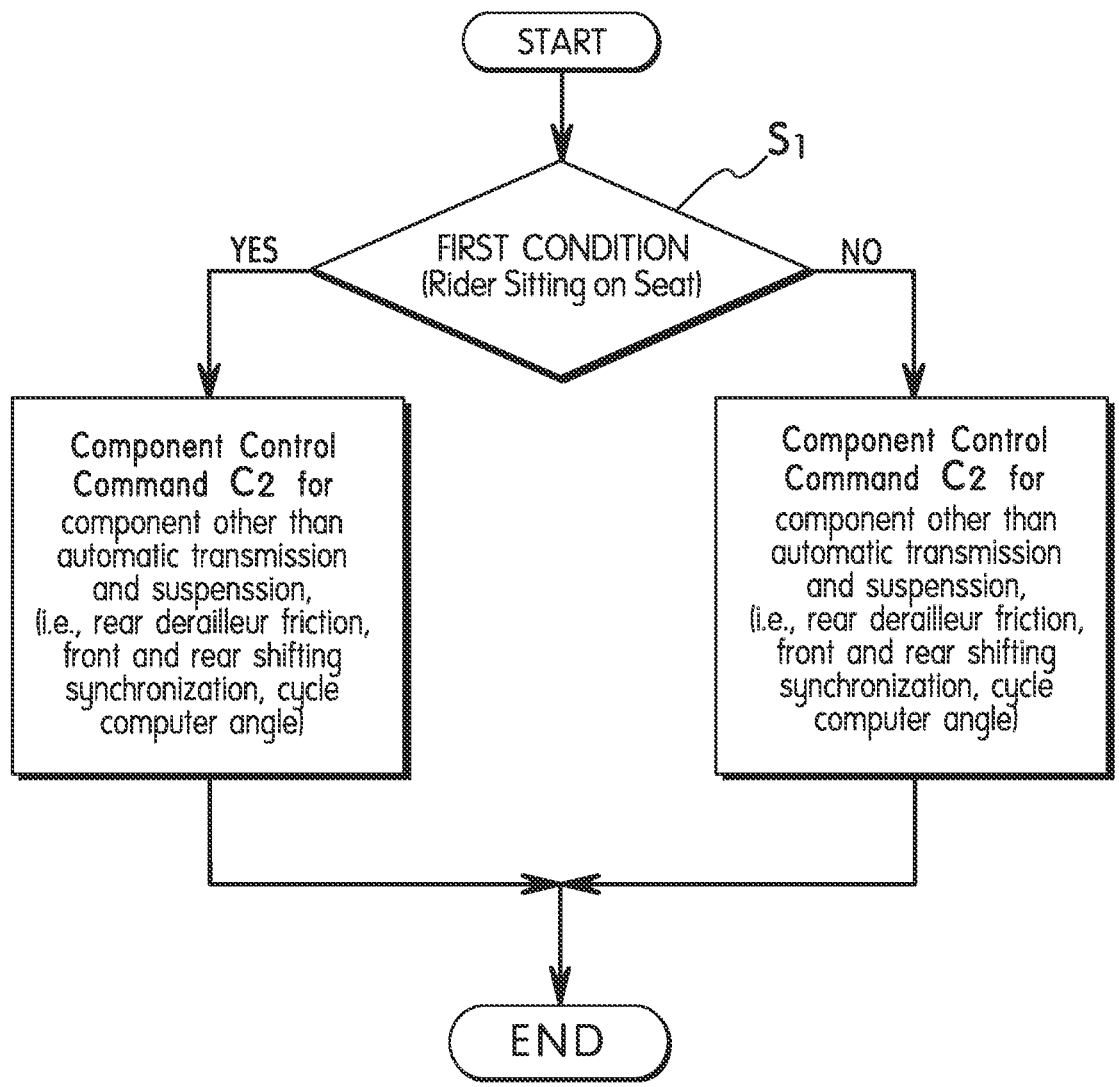
FIG. 25 is a flowchart illustrating an alternative, simplified, main control process for the second embodiment in which only the first condition is used to control components other than an automatic transmission and suspension.

Referring to FIG. 25, an alternative, simplified, (fifth) main process is illustrated in accordance with the second embodiment. In accordance with this process the bicycle component controlling apparatus 112 includes the first sensor (seat height position sensor 44) and the controller (52). The first sensor (seat height position sensor 44) is configured to detect a first operating condition $S_1$ and to output a first signal indicative of the first operating condition $S_1$. The first operating condition $S_1$ is whether a rider is sitting on a bicycle seat of a bicycle. The controller (52) is operatively connected to the first sensor (seat height position sensor 44). The controller (52) is configured to generate a component control command $C_2$ to control a bicycle component other than an automatic transmission and a suspension based on at least the first signal. The component control command $C_2$ can be a rear derailleur friction control command. The component control command $C_2$ can be a front and rear shifting synchronization control command. The component control command $C_2$ can be a cycle computer angle control command. Therefore in this control process, the second control command $C_2$ is generated not based on the second and third conditions $S_2$ and $S_3$, and components other than automatic transmission and suspension are controlled. In particular, only the first condition $S_1$ is used by the controller 52 to generate bicycle component control commands $C_2$ for rear derailleur (RD) friction, front and rear (F/R) shifting synchronization, and cycle computer (SC), but not for front suspension travel, front suspension lockout, rear suspension pedal dampening and automatic shifting mode. Table 7 illustrates examples of control commands $C_2$ generated by the controller 52 for rear derailleur (RD) friction, front and rear (F/R) shifting synchronization, and cycle computer (SC) angle in response to the detected results obtained by the first sensor for the first condition $S_1$.

TABLE 7

| sit down | RD friction | F/R synchro | SC angle |
|---|---|---|---|
| yes | ON | ON | 1st position |
| yes | OFF | ON | 1st position |
| no | ON | OFF | 2nd position |
| no | OFF | OFF | 2nd position |
| no | OFF | OFF | 2nd position |
| yes | OFF | ON | 1st position |
| yes | ON | ON | 1st position |
| yes | OFF | ON | 1st position |
| no | ON | OFF | 2nd position |
| no | OFF | OFF | 2nd position |

General Information

The main processes disclosed herein (FIGS. 4, 16 and 25) are performed at prescribed time intervals, which can be preset or adjustable. It should be noted that in the above explanations, the automatic shifting modes A, B and C correspond to predetermined shifting maps in a conventional manner. For example, each automatic mode A, B and C has a predetermined value corresponding to speed changing. In automatic mode, the controller 52 shifts the derailleur(s) based on the speed of the bicycle (signal from the front wheel sensor). The predetermined value corresponding to speed changing is different between the automatic mode A, B and C. Front and rear shift synchronization can be conducted in a manual shifting mode or an automatic shifting mode.

Rear suspension pedal dampening reduces pedal-induced suspension bob when in the (ON) mode. When suspension pedal dampening is turned (ON), resistance for the first portion is increased so that the shock is basically locked out for slow inputs such as pedaling uphill while not sitting. However, if a bump is hit that results in a fast input then the shock contracts past the first portion of shock travel such that the shock effectively absorbs the bump in a conventional manner. When front suspension lockout is (ON), the front suspension basically acts as a non-suspension fork. When front suspension travel is adjusted, the mount of possible travel is set (e.g. travel can be limited).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

Also as used herein, the following directional terms "forward", "rearward", "above", "downward", "vertical", "horizontal", "below" "lateral" and "transverse" as well as any other similar directional terms refer to directions with respect to an upright bicycle equipped with the bicycle component controlling apparatus on a level surface. Accordingly, these terms, as utilized to describe the various parts of the bicycle herein should be interpreted relative to an upright bicycle that is equipped with the bicycle component controlling apparatus in an installed position on a level surface.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or

What is claimed is:

1. A bicycle component controlling apparatus comprising:
   a first sensor configured to detect a first operating condition and to output a first signal indicative of the first operating condition, the first operating condition being whether a rider is sitting on a bicycle seat of a bicycle;
   a second sensor configured to detect a second operating condition and to output a second signal indicative of the second operating condition, the second operating condition being different from the first operating condition; and
   a controller operatively connected to the first sensor and the second sensor, the controller being configured to generate a component control command to control a bicycle component based on at least the first signal and the second signal.

2. The bicycle component controlling apparatus according to claim 1, wherein
   the second operating condition is a height of the bicycle seat.

3. The bicycle component controlling apparatus according to claim 1, wherein
   the second operating condition is rotation of a bicycle crank.

4. The bicycle component controlling apparatus according to claim 1, further comprising
   a third sensor configured to detect a third operating condition and to output a third signal indicative of the third operating condition, the third operating condition being different from the first and second operating conditions,
   the controller being operatively connected to the third sensor, the controller being further configured to generate the component control command based on the first, second and third signals.

5. The bicycle component controlling apparatus according to claim 4, wherein
   the second operating condition is a height of the bicycle seat.

6. The bicycle component controlling apparatus according to claim 5, wherein
   the third operating condition is rotation of a bicycle crank.

7. The bicycle component controlling apparatus according to claim 4, wherein
   the second operating condition is rotation of a bicycle crank.

8. The bicycle component controlling apparatus according to claim 1, wherein
   the component control command is a front suspension control command.

9. The bicycle component controlling apparatus according to claim 8, wherein
   the front suspension control command is an amount of travel control command.

10. The bicycle component controlling apparatus according to claim 8, wherein
    the front suspension control command is a lockout control command.

11. The bicycle component controlling apparatus according to claim 1, wherein
    the component control command is a rear suspension control command.

12. The bicycle component controlling apparatus according to claim 11, wherein
    the rear suspension control command is a pedaling damping control command.

13. The bicycle component controlling apparatus according to claim 1, wherein
    the component control command is a rear derailleur chain plate rotational resistance control command.

14. The bicycle component controlling apparatus according to claim 1, wherein
    the component control command is a front and rear shifting synchronization control command.

15. The bicycle component con ling apparatus according to claim 1, wherein
    the component control command is an automatic shifting mode control command.

16. The bicycle component controlling apparatus according to claim 1, wherein
    the component control command is a cycle computer angle control command.

17. A bicycle component controlling apparatus comprising:
    a first sensor configured to detect a first operating condition and to output a first signal indicative of the first operating condition, the first operating condition being whether a rider is sitting on a bicycle seat of a bicycle; and
    a controller operatively connected to the first sensor, the controller being configured to generate a component control command to control a bicycle component other than an automatic transmission and a suspension based on at least the first signal.

18. The bicycle component controlling apparatus according to claim 17, wherein
    the component control command is a rear derailleur chain plate rotational resistance control command.

19. The bicycle component controlling apparatus according to claim 17, wherein
    the component control command is a front and rear shifting synchronization control command.

20. The bicycle component controlling apparatus according to claim 17, wherein
    the component control command is a cycle computer angle control command.

* * * * *